US011305756B2

(12) United States Patent
Yamanaka et al.

(10) Patent No.: US 11,305,756 B2
(45) Date of Patent: Apr. 19, 2022

(54) PARKING CONTROL METHOD AND PARKING CONTROL APPARATUS

(71) Applicant: Nissan Motor Co., Ltd., Yokohama (JP)

(72) Inventors: Ryota Yamanaka, Kanagawa (JP); Yasuhiro Suzuki, Kanagawa (JP); Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 36 days.

(21) Appl. No.: 16/954,859

(22) PCT Filed: Dec. 20, 2017

(86) PCT No.: PCT/JP2017/045818

§ 371 (c)(1),
(2) Date: Jun. 17, 2020

(87) PCT Pub. No.: WO2019/123586

PCT Pub. Date: Jun. 27, 2019

(65) Prior Publication Data

US 2021/0086758 A1 Mar. 25, 2021

(51) Int. Cl.
*B60W 30/06* (2006.01)
*B60W 40/08* (2012.01)

(52) U.S. Cl.
CPC ............ *B60W 30/06* (2013.01); *B60W 40/08* (2013.01); *B60W 2554/20* (2020.02); *B60W 2554/4041* (2020.02); *B60W 2554/80* (2020.02)

(58) Field of Classification Search
None
See application file for complete search history.

(56) References Cited

U.S. PATENT DOCUMENTS

| | | | | |
|---|---|---|---|---|
| 6,170,591 | B1 * | 1/2001 | Sakai | B62D 15/0285 180/204 |
| 2015/0353080 | A1 | 12/2015 | Mukaiyama | |
| 2017/0129537 | A1 * | 5/2017 | Kim | G05D 1/0011 |
| 2017/0301241 | A1 | 10/2017 | Urhahne et al. | |
| 2018/0321685 | A1 * | 11/2018 | Yalla | G05D 1/0274 |
| 2019/0137990 | A1 * | 5/2019 | Golgiri | G05D 1/005 |
| 2020/0387153 | A1 * | 12/2020 | Noguchi | G05D 1/0022 |

FOREIGN PATENT DOCUMENTS

| | | | |
|---|---|---|---|
| JP | 2008-074296 | A | 4/2008 |
| JP | 2017-007399 | A | 1/2017 |
| WO | 2017/168754 | A1 | 10/2017 |

OTHER PUBLICATIONS

Mico Silver: "BMW remote parking—self/autonomous parking", Youtube, Jan. 29, 2017 (Jan. 29, 2017), p. 1 pp., [retrieved on Oct. 20, 2020] * time instances with video/audio of particular importance: 06s, 52s, Im20s, Im23s, * URL : https://www.youtube.com/watch?v=vnUPcrTTis0.

* cited by examiner

*Primary Examiner* — David P. Merlino
(74) *Attorney, Agent, or Firm* — Young Basile Hanlon & MacFarlane, P.C.

(57) ABSTRACT

A parking control method includes: performing parking control of moving a vehicle to a target parking position on the basis of an operation command acquired from an operator located outside the vehicle; and when the parking control to the target parking position is suspended and the vehicle leaves the target parking position, moving the vehicle so that at least part of the vehicle is present within a predetermined range from the operator.

7 Claims, 16 Drawing Sheets

Pa CR $R_R$ $D_{M1}$ PL1 OB V V' M,5

5
M
211
V

W
CR
R_R
D_M2(>D_M1)
M,5
V'
Pa
V
OB
PL1

W
CR
$D_{M1}$
M,5
V'
Pa
$R_R$
V
OB
PL1

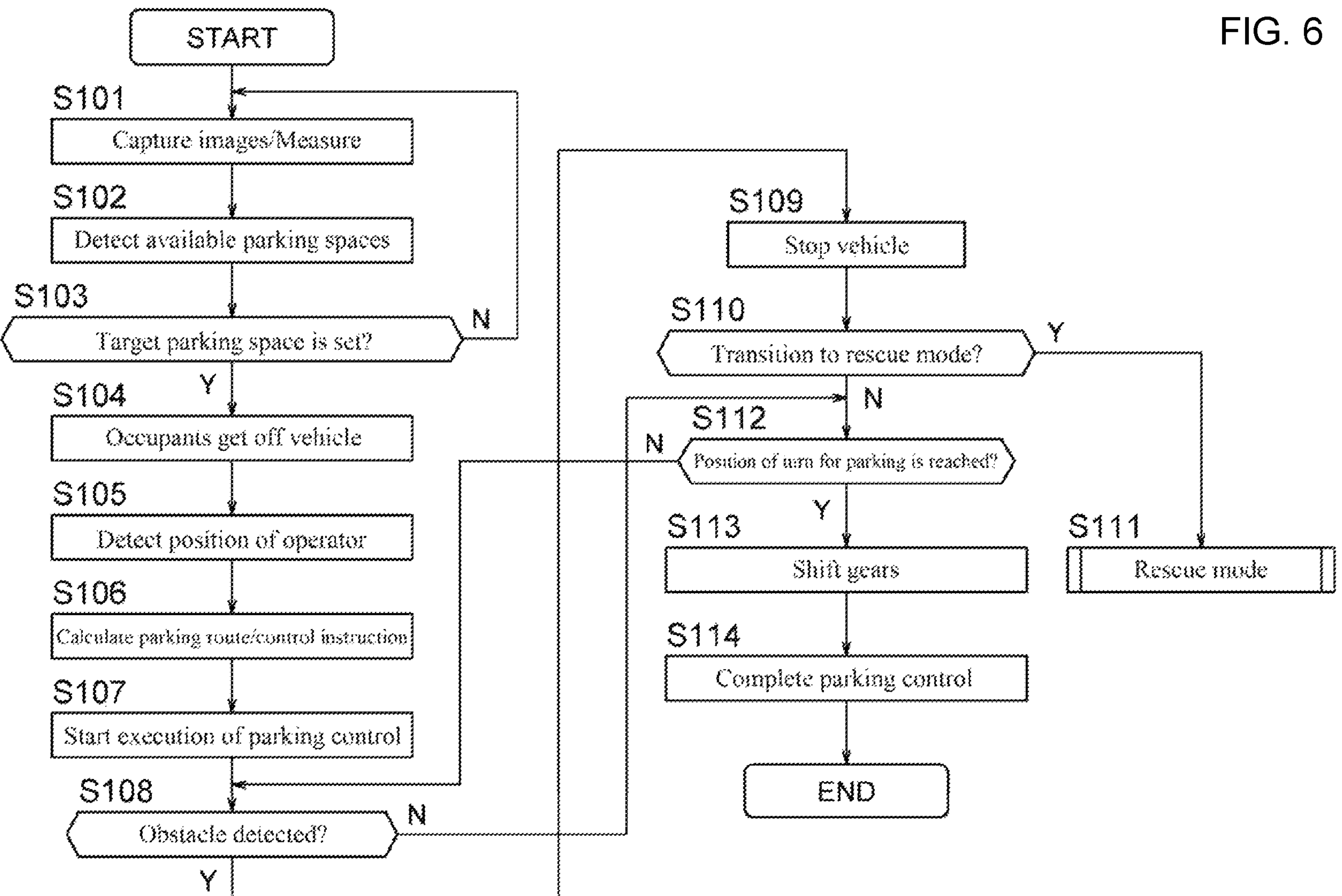
FIG. 6
START
S101
Capture images/Measure
S102
Detect available parking spaces
S103
Target parking space is set?
N
Y
S104
Occupants get off vehicle
S105
Detect position of operator
S106
Calculate parking route/control instruction
S107
Start execution of parking control
S108
Obstacle detected?
N
Y
S109
Stop vehicle
S110
Transition to rescue mode?
Y
N
S112
Position of turn for parking is reached?
N
Y
S113
Shift gears
S111
Rescue mode
S114
Complete parking control
END

PARKING CONTROL METHOD AND PARKING CONTROL APPARATUS

TECHNICAL FIELD

The present invention relates to a parking control method and a parking control apparatus.

BACKGROUND

A technique for an operator to remotely operate a vehicle is known, in which when the vehicle is parked into a parking space, the vehicle is controlled to make a stop if an obstacle is detected (JP2008-74296A).

When a determination is once made that parking is not possible due to the detection of an obstacle, the vehicle is controlled to make a stop and the driver therefore has to move to the stop position of the vehicle to drive the vehicle in order for the vehicle to leave the parking space, which may impose a burden on the operator.

SUMMARY

A problem to be solved by the present invention is to alleviate the burden imposed on an operator by preliminarily moving a vehicle so that the vehicle is present within a predetermined range from the operator even when a determination is once made that parking is not possible and the vehicle leaves a target parking position.

The present invention solves the above problem by, when parking control to a target parking position is suspended and the vehicle leaves the target parking position, moving the vehicle so that at least part of the vehicle is present within a predetermined range from the operator.

According to the present invention, even when a determination is once made that parking is not possible and the vehicle leaves the target parking position, the vehicle is preliminarily moved to a position within the predetermined range from the operator and it is therefore possible to prevent the operator from moving to the stop position of the vehicle and alleviate the burden imposed on the operator.

BRIEF DESCRIPTION OF THE DRAWINGS

FIG. 6 is a flowchart illustrating an example of a control procedure executed by the parking control system according to one or more embodiments of the present invention;

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. One or more embodiments of the present invention will be described with reference to a configuration in which the parking control apparatus is equipped in a vehicle, but the parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
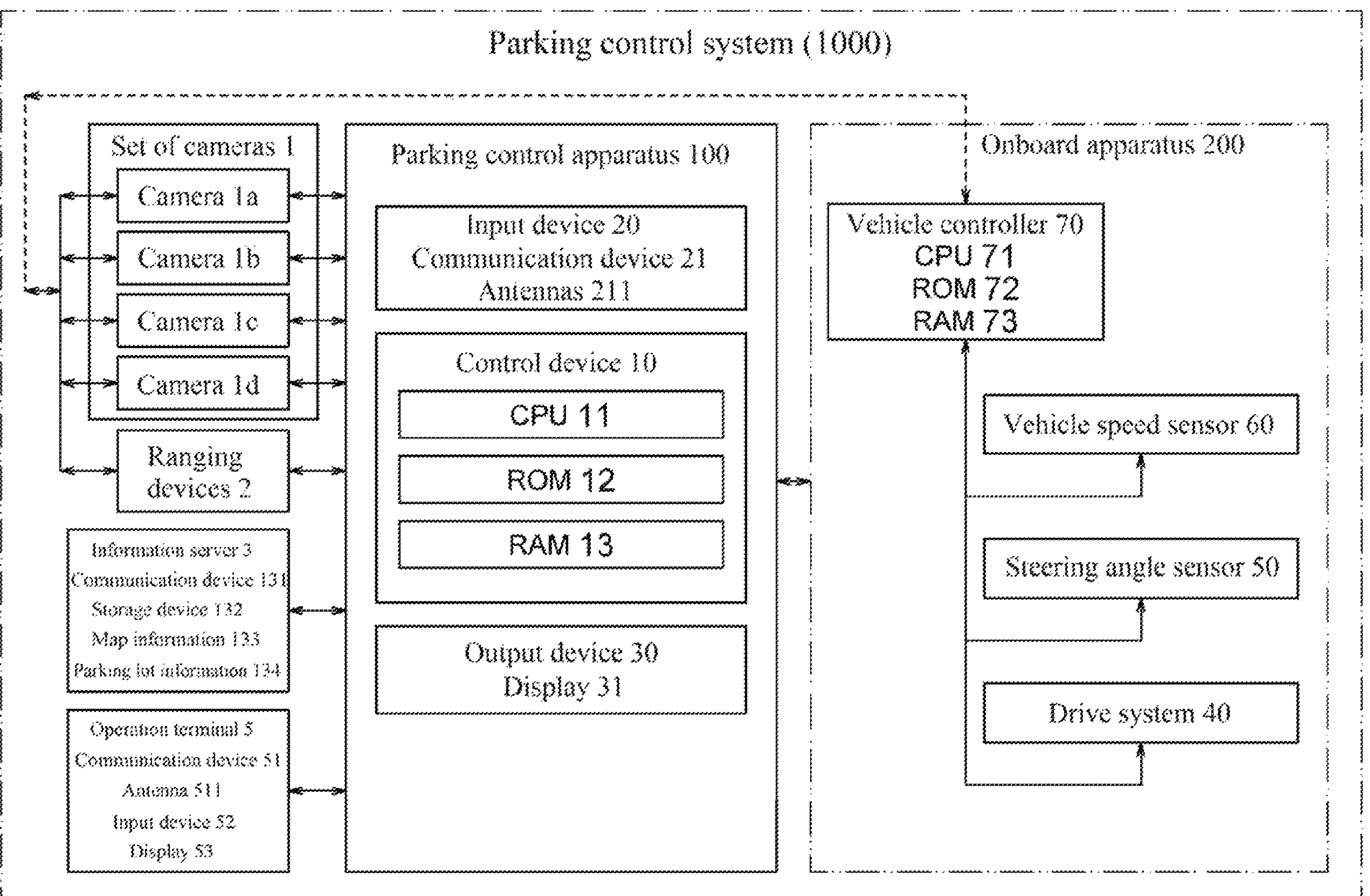
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes a set of cameras 1, one or more ranging devices 2, an information server 3, an operation terminal 5, the parking control apparatus 100, and an onboard apparatus 200. The onboard apparatus 200 includes a vehicle controller 70, a drive system 40, a steering angle sensor 50, and a vehicle speed sensor 60. The parking control apparatus 100 according to one or more embodiments of the present invention controls an operation of moving (parking) a vehicle as the target of control into a parking space on the basis of an operation command that is input from the operation terminal 5.

The set of cameras 1 includes, for example, cameras 1*a* to 1*d* as illustrated. The cameras 1*a* to 1*d* are installed at the front part, right-side part, left-side part, and rear part of the vehicle, respectively. For example, the camera 1*a*, which is installed at or near the front bumper of the vehicle, captures an image ahead of the vehicle and outputs the image information to the parking control apparatus 100. The camera 1*b*, which is installed on the right side of the vehicle (e.g., on the right side of the front end of the vehicle), captures an image on the right side of the vehicle and outputs the image information to the parking control apparatus 100. The camera 1*c*, which is installed on the left side of the vehicle (e.g., on the left side of the front end of the vehicle), captures an image on the left side of the vehicle and outputs the image information to the parking control apparatus 100. The camera 1*d*, which is installed at or near the rear bumper of the vehicle, captures an image behind the vehicle and outputs the image information to the parking control apparatus 100.

The one or more ranging devices 2 measure the distance from the vehicle to an object existing around the vehicle. Examples of the ranging devices 2 include radar devices, such as a millimeter-wave radar device, a laser radar device, and an ultrasonic radar device, and sonar devices. The number of the ranging devices 2 is not particularly limited and the ranging devices 2 may thus be two or more ranging devices 2. The ranging devices 2 may be installed at the same positions as the cameras 1*a* to 1*d* of the set of cameras 1 or may also be provided at different positions. Objects existing around the vehicle include obstacles, pedestrians, and other vehicles. The ranging devices 2 detect not only the distance to an object but also the presence or absence of the object and the position of the object with respect to the vehicle. The ranging devices 2 detect the presence or absence of an object, the distance to the object, and the position of the object and outputs the detection results to the parking control apparatus 100.

The information server 3 is an information provision apparatus provided on a network capable of communication. The information server includes a communication device 131 and a storage device 132. The storage device 132 includes readable map information 133 and parking lot information 134. The map information 133 includes positional information of parking facilities. The parking lot information 134 includes, for each parking facility, the location and identification number of each parking lot and positional information of passages, pillars, walls, storage spaces, etc. in the parking facility. The parking lot information 134 further includes the traffic direction of vehicles in a passage of the parking facility. The parking lot information 134 is not limited to the above information and may include, for each parking facility, information on available parking spaces as information on parking lots in which the vehicle can be parked. The parking control apparatus 100 and the operation terminal 5 can access the storage device 132 of the information server 3 to acquire various information items.

The operation terminal 5 is a portable computer that can be brought out to outside of the vehicle and has an input function and a communication function. The operation terminal 5 receives the input of an operation command made by an operator for controlling the driving (operation) of the vehicle for parking. The driving includes operations for parking (operations for entering a parking space and exiting the parking space). The operator inputs instructions via the operation terminal 5. The instructions include an operation command for execution of parking. The operation command includes information on the execution/stop of parking control, selection/change of a target parking position, and selection/change of a parking route and other information necessary for parking. The operator can also make the parking control apparatus 100 recognize the instructions including the operation command without using the operation terminal 5, such as by a gesture of the operator (i.e., the operator can input such instructions to the parking control apparatus 100 without using the operation terminal 5, such as by a gesture).

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The vehicle controller 70 is a controller that controls driving of the vehicle.

Examples of the vehicle controller 70 include a computer and an electronic control unit (ECU). The vehicle controller 70 includes a ROM 72 that stores a vehicle drive control program, a CPU 71 as an operation circuit that executes the program stored in the ROM 72 to serve as a drive control device, and a RAM 73 that serves as an accessible storage device. The target steering angle and target speed of the vehicle are input from the parking control apparatus 100 to the vehicle controller 70, and the detection value from the steering angle sensor 50 and the detection value from the vehicle speed sensor 60 are input to the vehicle controller 70. When executing the control of parking the vehicle, the vehicle controller 70 controls the operation of the drive system 40 on the basis of the target steering angle and the target speed which are input to the parking control apparatus 100. The vehicle controller 70 outputs the detection value from the steering angle sensor 50 and the detection value from the vehicle speed sensor 60 to the parking control apparatus 100. The target steering angle and target speed of the vehicle, which are input from the parking control apparatus 100, will be described later.

The drive system 40 operates the vehicle to move (travel) from the current position to the target parking position by driving based on the control command signal acquired from the parking control apparatus 100 via the vehicle controller 70. The steering device (not illustrated) according to one or more embodiments of the present invention is a drive mechanism that moves the vehicle in the right or left direction. The drive system 40 includes an EPS motor. The EPS motor acquires the control command signal from the parking control apparatus 100 via the vehicle controller 70. Then, the EPS motor controls the steering amount by driving a power steering mechanism included in the steering of the steering device on the basis of the acquired control command signal and controls the operation when moving the vehicle to the target parking position. The control content and operation scheme for parking the vehicle are not particularly limited, and schemes known at the time of filing the present application can be appropriately applied.

The steering angle sensor 50, which is installed inside the steering column, for example, detects the rotation angle of the steering wheel and outputs the detected value to the parking control apparatus 100 via the vehicle controller 70.

The vehicle speed sensor 60 calculates the vehicle speed of the vehicle from the wheel speed detected by a wheel-side sensor (not illustrated) that detects the rotational speed of the wheel, and outputs the detected value to the parking control apparatus 100 via the vehicle controller 70.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the received operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. When an occupant (driver or passenger) is present in the vehicle, the output device 30 can notifies the occupant in the vehicle of the parking control information via the display 31. Additionally or alternatively, the output device 30 can transmit the parking control information to the operation terminal 5 and notify the operator carrying the operation terminal 5 of the parking control information via the display 53 of the operation terminal 5. The display 31 according to one or more embodiments of the present invention is a touch panel-type display having an input function and an output function. When the display 31 has an input function, it serves as the input device 20. Even when the vehicle is controlled based on the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program for performing the parking control of moving the vehicle to the target parking position on the basis of the operation command transmitted from the external operation terminal 5. The parking control apparatus 100 outputs the target speed and target steering angle of the vehicle, which are calculated by the program, to the vehicle controller 70. The vehicle controller 70 operates the drive system 40 in accordance with the target speed and target steering angle, and the vehicle can thereby move along the parking route at an appropriate speed to park at the target parking position.

Additionally or alternatively, the parking control program according to one or more embodiments of the present invention is a program for moving the vehicle in a direction in which the vehicle leaves the target parking position when the vehicle cannot be parked at the target parking position for some reason while moving to park at the target parking position. For example, when the set of cameras 1 or the like detects an obstacle on or near the parking route, the parking control apparatus 100 suspends the parking control. Then, to allow the operator to select whether or not the vehicle control should transition from the parking control to a rescue mode, the parking control apparatus 100 transmits to the operation terminal 5 information that the parking control will be suspended and information with which the operator can select the rescue mode.

The rescue mode refers to a so-called return mode in which when the vehicle is put into a situation that the vehicle cannot be parked at the target parking position during execution of the parking control to the target parking position, the parking control is suspended and the vehicle is moved to a given position separated from the target parking position. Specific processing after transition to the rescue mode will be described later. In the above-described example, when the operator touches a button on the screen for executing the rescue mode displayed on the screen of the display 53 of the operation terminal 5, operation command information for executing the rescue mode is input as an operation command for executing the rescue mode to the parking control apparatus 100 via the communication network, and the program of the rescue mode is executed.

The parking control apparatus 100 according to one or more embodiments of the present invention is a remote control-type apparatus that receives the operation command from outside and controls the movement of the vehicle to park the vehicle into a given parking space. Occupants of the vehicle may be located outside the vehicle interior or may also be located inside the vehicle interior.

The control device 10 of the parking control apparatus 100 according to one or more embodiments of the present invention has functions of executing a target parking frame setting process, a parking start position setting process, a current position estimation process, an operator position detection process, and a parking route generation process as the functions of executing the above-described parking control. In addition, the control device 10 has functions of executing an obstacle detection process, a deceleration process, an operator position detection process, a rescue route generation process, and a vehicle stop process as the functions of executing the above-described rescue mode. The control device 10 further has functions of executing a route following process and a target speed generation process to move the vehicle along the parking route generated by the parking route generation process or along the rescue route generated by the rescue route generation process. The rescue route will be described later. Each of the above processes is executed by cooperation of software for implementing the process and the above-described hardware. These processes will be described below.

First, the functions of executing the parking control will be described. The target parking frame setting process will be described. The control device 10 sets a parking frame for parking the vehicle by automated (autonomous) driving (referred to as a target parking frame, hereinafter). The control device 10 detects parking frames in the parking lot from the images captured by the set of cameras 1. For example, the control device 10 generates an overhead view image from the images captured by the set of cameras 1 and detects frame line candidates that consist each parking frame from the overhead view image. Then, the control device 10 determines whether or not the detected frame line candidates satisfy determination conditions for the interval with another frame line, the relative angle to another frame line, the length, etc., and detects spaces defined by the frame line candidates satisfying the above determination conditions as the parking frames. The present invention is not limited to generating the overhead view image from the images captured by the set of cameras 1 to detect the parking frames from the overhead view image, and information on the parking frames may be acquired, for example, through communication with outside of the vehicle, that is, so-called road-to-vehicle communication or vehicle-to-vehicle communication.

Here, the automated (autonomous) driving refers to driving in which the parking control apparatus 100, rather than the driver, performs the steering operation of the steering device, the accelerator operation, and the brake operation in an automated (autonomous) manner via the vehicle controller 70. The parking control apparatus 100 is not limited to a type of performing all the operations for the driving control of the vehicle in an automated (autonomous) manner and may also be of a semiautomated (semiautonomous) type in which the steering operation is performed in an automated (autonomous) manner while the driver performs the accelerator/brake operation. In the latter case, for example, the driver gets on the vehicle and performs the accelerator/brake operation, and a passenger of the vehicle other than the driver or a worker of the parking facility operates the operation terminal 5.

Then, the control device 10 detects spaces into which parking is possible (referred to as available parking spaces, hereinafter) from among the detected parking frames. For example, on the basis of the ranging information (reflection point information) from the ranging devices 2, the control device 10 determines whether or not an obstacle is present in the detected parking frames or the routes when parking into the parking frames. Then, the control device 10 detects parking frames with no obstacle as the available parking spaces. The present invention is not limited to detecting the available parking spaces on the basis of the ranging information from the ranging devices 2, and the available parking spaces may also be detected, for example, from images captured by the set of cameras 1 or a camera installed in the parking lot. Additionally or alternatively, information on the available parking spaces may be acquired, for example, from the parking lot information 134 by accessing the information server 3.

Then, the control device 10 detects a parking space recommended for the driver and passengers of the subject vehicle (referred to as a recommended parking space, hereinafter) from among the available parking spaces and presents the recommended parking space to the driver and passengers of the subject vehicle. For example, the control device 10 transmits information on the recommended parking space to the operation terminal 5 and controls the display 53 of the operation terminal 5 to display the information on the recommended parking space. Additionally or alternatively, the control device 10 controls the display 31 of the output device 30 to display information on the recommended parking space. When there are two or more available parking spaces as the above, the control device 10 determines an available parking space to which the required time when parking into the available parking space is the shortest, for example, as the recommended parking space. Additionally or alternatively, for example, the control device 10 determines an available parking space closest to the gaze point of the driver of the subject vehicle as the recommended parking space.

Then, the control device 10 receives the designation of a target parking frame made by the driver or a passenger of the subject vehicle and sets a target parking position at which the vehicle is parked. The driver or passenger of the subject vehicle can designate the target parking frame, such as by touching an icon of the recommended parking space displayed on the touch panel-type display 53 of the operation terminal 5 or moving a cursor on the display to the icon of the recommended space with a cursor operation key displayed on the display 53 and operating an enter button. The designation of the target parking frame is not limited to being designated by a person, and the parking facility side may automatically designate the target parking frame. For example, the display 53 of the operation terminal 5 may be configured to display one recommended parking space that is designated on the parking facility side, and the driver or passenger of the subject vehicle may designate the recommended parking space. The control device 10 executes such a process to set the target parking position as a position at which the vehicle is parked.

The parking start position setting process will then be described. To calculate a parking route, which will be described later, the control device 10 sets a position at which parking control is started (referred to as a parking start position, hereinafter). For example, when the user operates a start switch provided on the operation terminal 5 for starting the parking control, the current position of the vehicle at that time is set as the parking start position. The method of specifying the current position is not particularly limited. For example, the control device 10 may access the information server 3 via antennas 211 to calculate the current position from the map information 133 or may use the global positioning system (GPS) to measure the current position of the vehicle.

The current position estimation process will then be described. To move the vehicle along the parking route or rescue route, which will be described later, the control device 10 estimates the current position of the vehicle. For example, the control device 10 measures the current position of the vehicle using the GPS, acquires the current position through the road-to-vehicle communication, or calculates the current position on the basis of the steering amount of the steering and the accelerator operation amount.

The operator position detection process will then be described with reference to FIG. 2A to FIG. 2D. The control device 10 detects the position of the operator carrying the operation terminal 5. The position of the operator is used for generation of the parking route or rescue route. The position of the operator includes information on the position on the movement plane of the vehicle and information on the height position. For example, the control device 10 detects the position of the operation terminal 5 carried by the operator and calculates the position of the operator on the basis of the position of the operation terminal 5. The operation terminal 5 may be provided at a predetermined position or may also be carried by the operator. When the operation terminal 5 is provided at a predetermined position, the operator moves to the position at which the operation terminal 5 is provided, and uses the operation terminal 5 at that position. In these cases, the control device 10 can determines the position of the operation terminal 5 as the position of the operator.

Figure 2A:
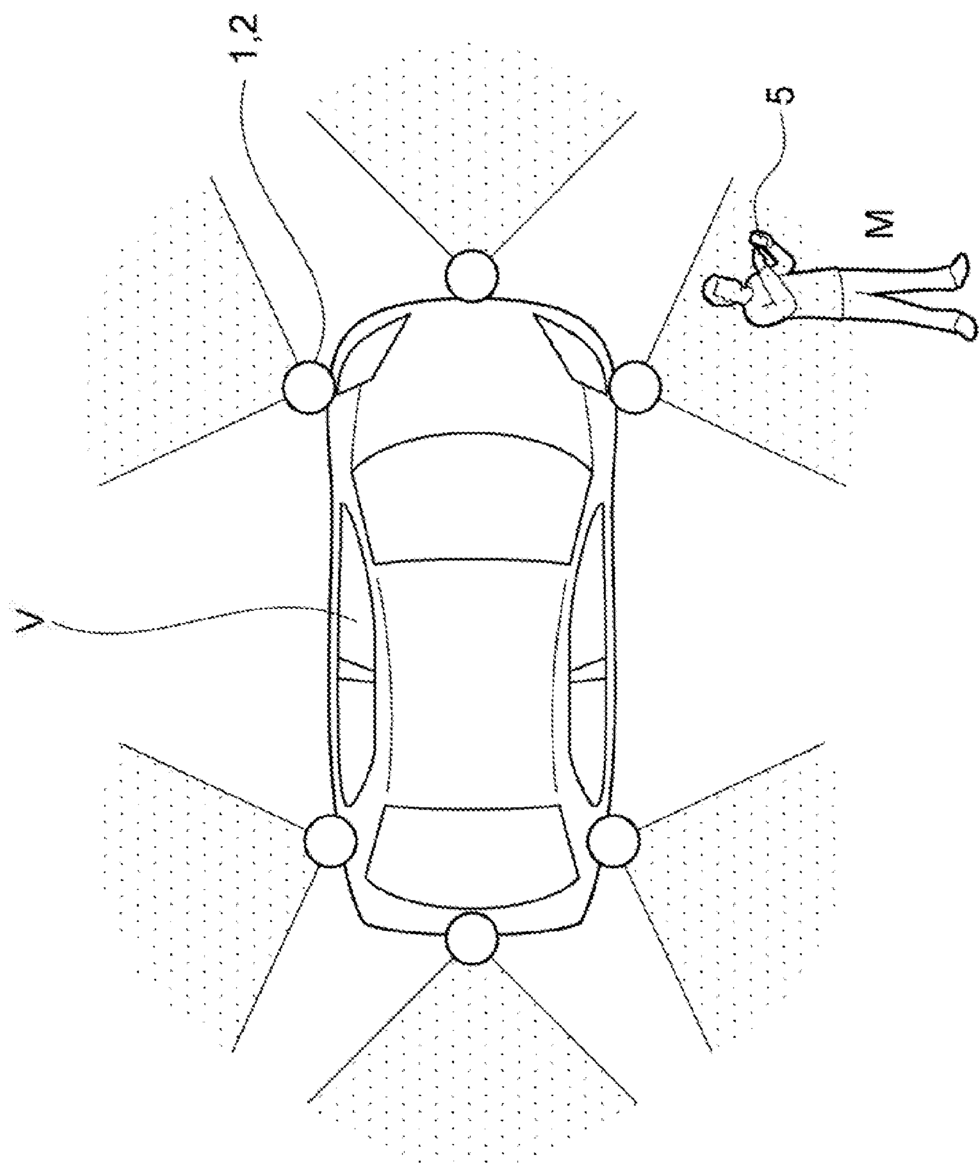
FIG. 2A is a diagram for describing a first detection scheme as an example of a detection method for the position of an operator.

FIG. 2A is a diagram to describe detecting the position of an operator M on the basis of the detection results from the multiple ranging devices 2 provided in a vehicle V and/or the images captured by the set of cameras 1. The control device 10 detects the position of the operator M on the basis of the images captured by the cameras 1*a* to 1*d*. Additionally or alternatively, the control device 10 detects the two-dimensional position and/or three-dimensional position of the operator M on the basis of the detection results from the ranging devices 2.

Figure 2B:
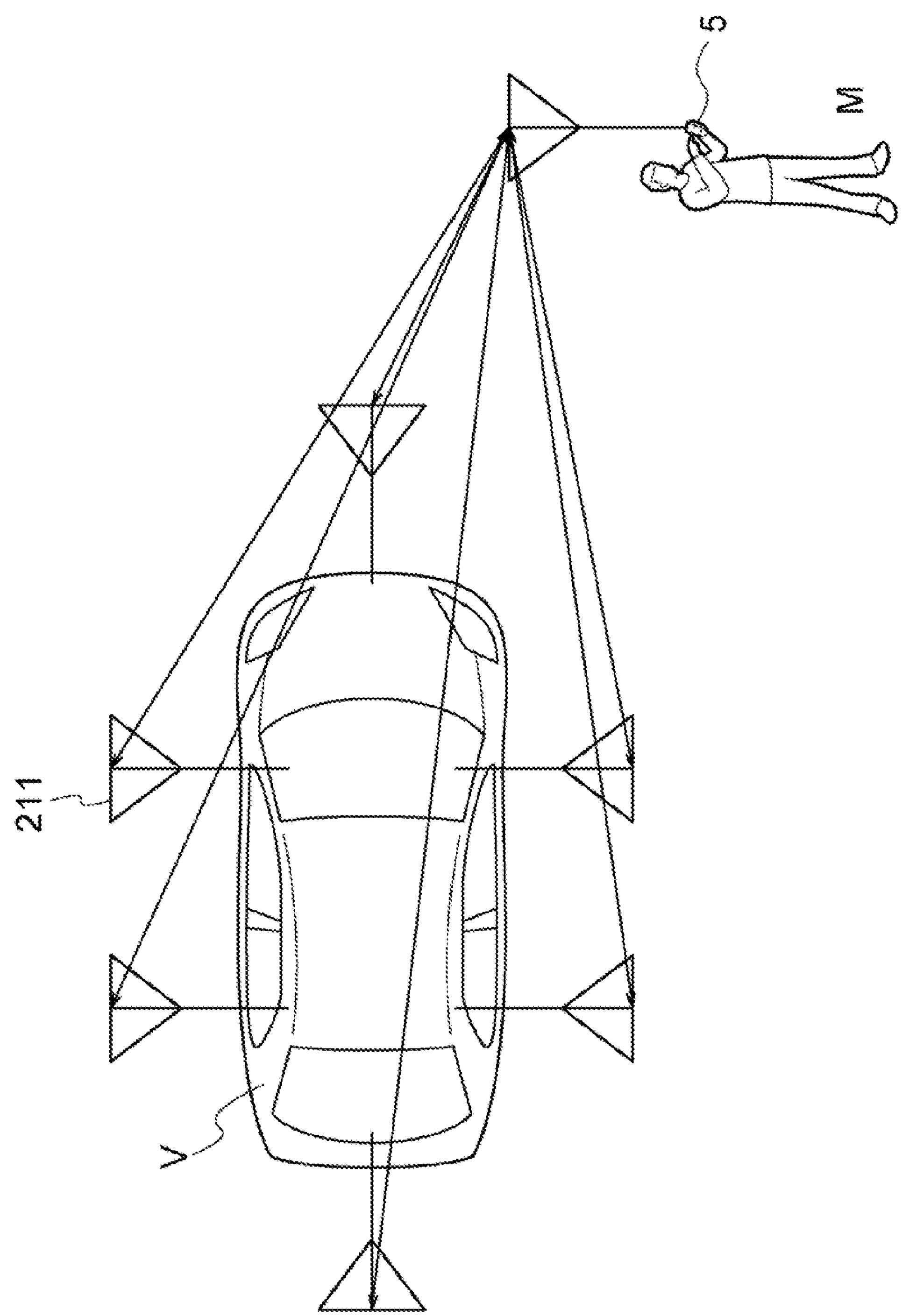
FIG. 2B is a diagram for describing a second detection scheme as an example of a detection method for the position of an operator.

FIG. 2B is a diagram to describe detecting the position of the operation terminal 5 or the position of the operator M carrying the operation terminal 5 on the basis of the communication radio waves between the multiple antennas 211 provided at different positions of the vehicle V and the operation terminal 5. When the multiple antennas 211 communicate with one operation terminal 5, the intensity of the received radio wave of each antenna 211 is different. The control device 10 calculates the position of the operation terminal 5 on the basis of the intensity difference between the received radio waves of the antennas 211. Additionally or alternatively, the control device 10 calculates the two-dimensional position and/or three-dimensional position of the operation terminal 5 or the operator M from the intensity difference between the received radio waves of the antennas 211.

Figure 2C:
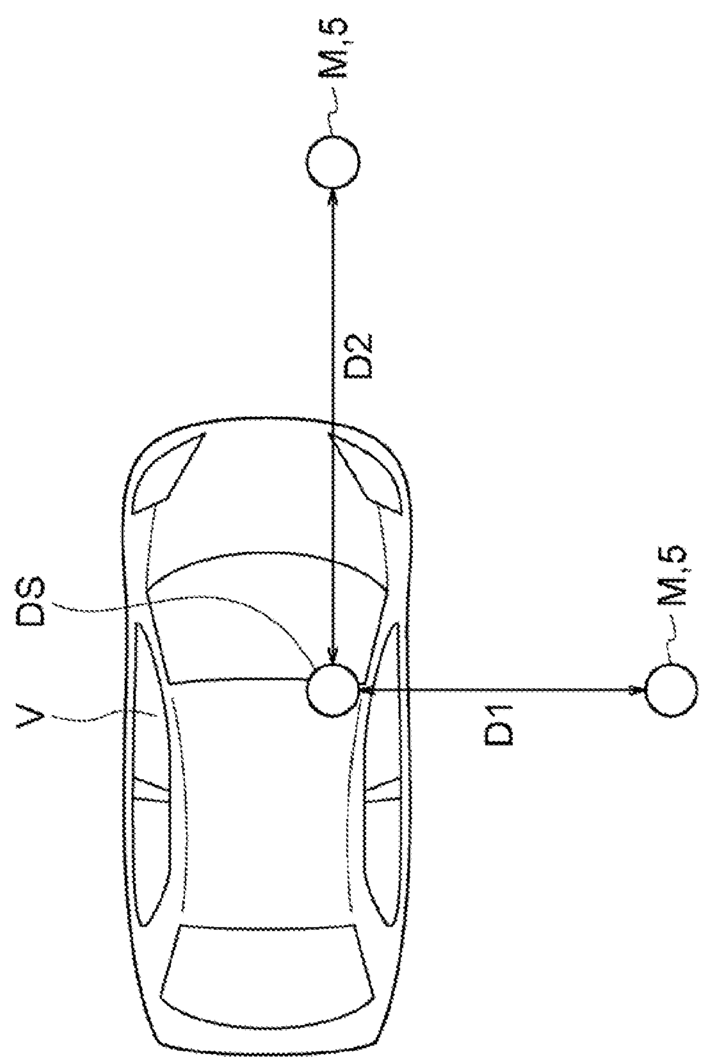
FIG. 2C is a diagram for describing a third detection scheme as an example of a detection method for the position of an operator.

FIG. 2C is a diagram to describe preliminarily designating a predetermined position (direction/distance: D1, D2) with respect to the driver seat DS of the vehicle as the operating position of the operator M or as the position at which the operation terminal 5 is installed. For example, when the operator M temporarily stops the vehicle V at a designated position and gets off the vehicle V to operate the operation terminal 5 provided at the predetermined position, the control device 10 calculates the initial position of the operator M with respect to the vehicle V or the initial position of the terminal 5, which is carried by the operator M, with respect to the vehicle V.

Figure 2D:
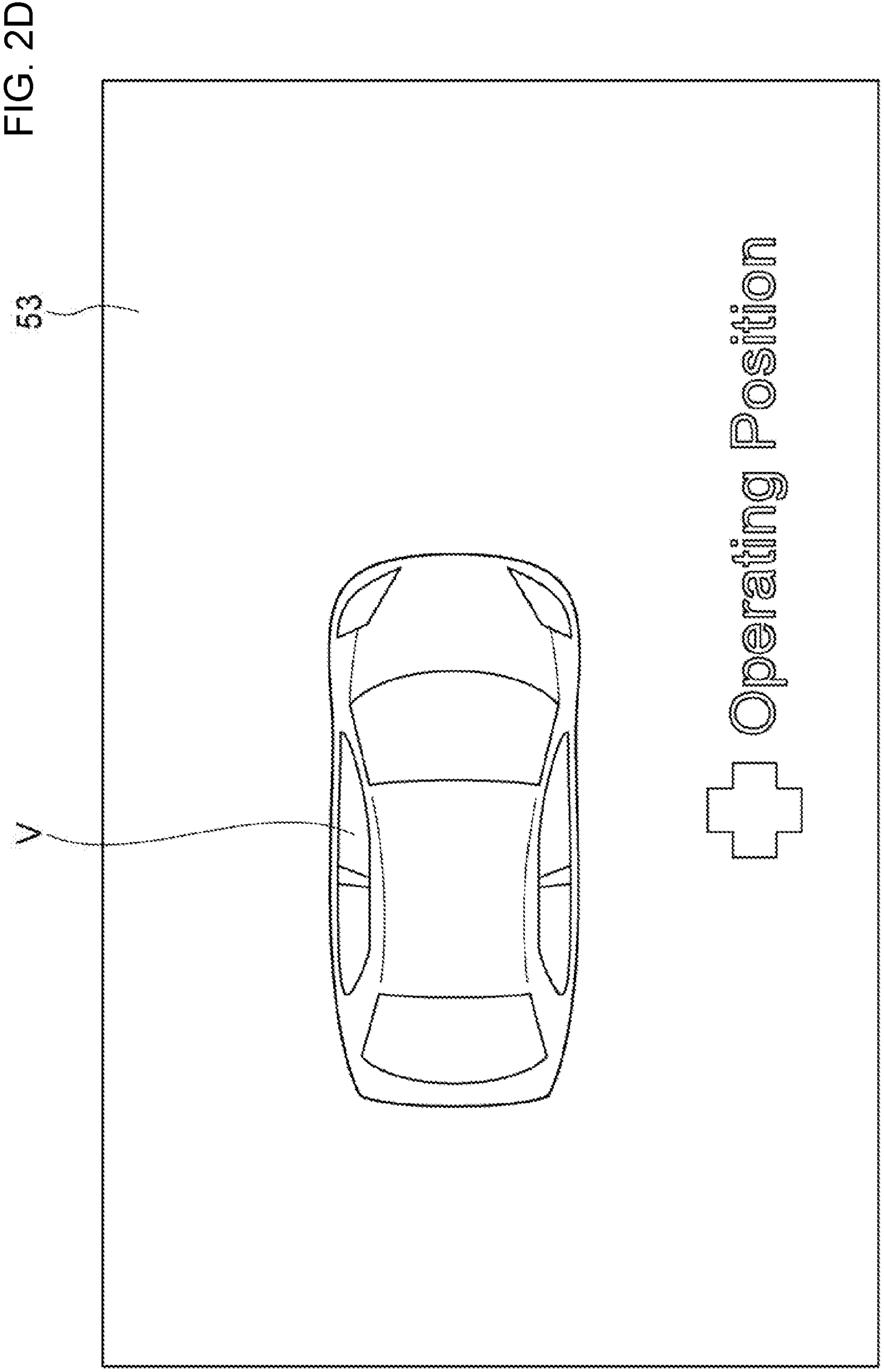
FIG. 2D is a diagram for describing a fourth detection scheme as an example of a detection method for the position of an operator.

FIG. 2D is a diagram to describe displaying image information representing the calculated operating position (a position at which the operator M stands: operation position) on the display 53 of the operation terminal 5. When detecting the position of the operator, the control device 10 controls the display 53 of the operation terminal 5 to display the image as illustrated in FIG. 2D. This display control may be executed by an application installed on the operation terminal 5 side or may also be executed based on a command from the control device 10.

The parking route generation process will then be described. The control device 10 generates a route from the parking start position to the target parking position (referred to as a parking route, hereinafter) as a route for parking the vehicle into the target parking frame. The shape of the parking route is not particularly limited, and the parking route may be a straight route, a curved route, or a route of the combination thereof. When the vehicle turns for parking before reaching the target parking position, the parking route includes a route from the parking start position to the position of turn for parking and a route from the position of turn for parking to the target parking position. For example, the control device 10 calculates as the parking route a route obtained by combining a curved route from the parking start position to the position of turn for parking and a straight route from the position of turn for parking to the target parking position. The present invention is not limited to calculating the parking route, and the parking route determined for each parking frame may be preliminarily stored in a memory (e.g., the ROM 12), for example, and the control device 10 may read the parking route from the memory. Additionally or alternatively, for example, the control device 10 may acquire information on a predetermined parking route through road-to-vehicle communication or vehicle-to-vehicle communication to generate the parking route. Additionally or alternatively, the parking route can be generated through setting a halfway position between the parking start position and the target parking position, generating a parking route from the parking start position to the halfway position, and generating a parking route from the halfway position to the target parking position when approaching the halfway position. Additionally or alternatively, when the surrounding situation changes or when the position of the vehicle deviates from the parking route, the parking route can be generated again and changed during the control.

The function of executing the rescue mode will then be described. The obstacle detection process will be described with reference to FIGS. 3A and 3B. The control device 10 detects obstacles existing outside the vehicle. The obstacles include structures such as walls and pillars of a parking lot, installation objects around the vehicle, pedestrians, other vehicles, parked vehicles, and other similar objects.

Figure 3A:
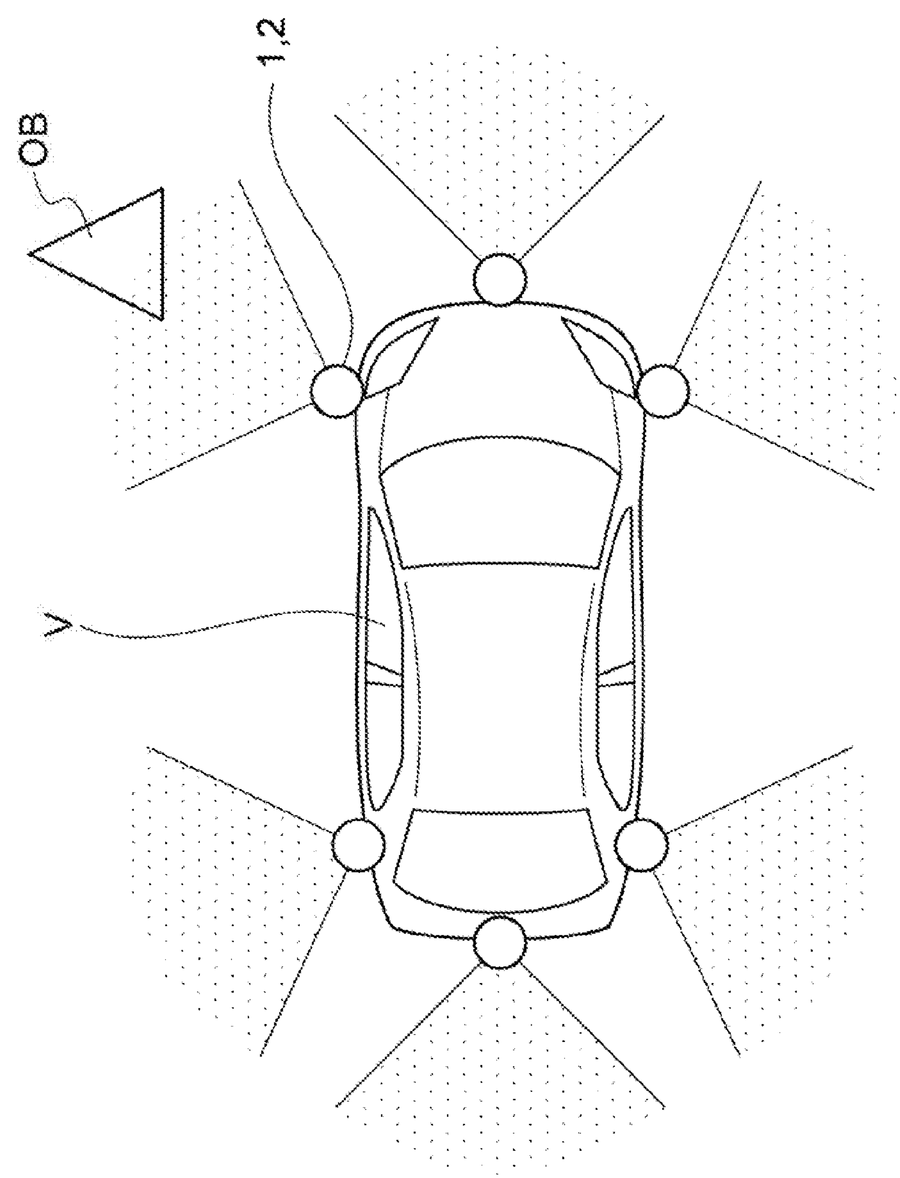
FIG. 3A is a diagram for describing a first detection scheme as an example of a detection method for an obstacle.

FIG. 3A is a diagram to describe detecting an obstacle OB existing around the vehicle V. As illustrated in FIG. 3A, the control device 10 detects the obstacle OB on the basis of the detection results from the multiple ranging devices 2 provided in the vehicle and/or the images captured by the set of cameras 1. The detection results from the ranging devices 2 include the presence or absence of the obstacle OB, the position of the obstacle OB, the size of the obstacle OB, and the distance to the obstacle OB. Additionally or alternatively, the control device 10 performs image processing on the images captured by the cameras 1*a* to 1*d* thereby to detect the presence or absence of the obstacle OB, the position of the obstacle OB, the size of the obstacle OB, and the distance to the obstacle OB. The detection of an obstacle is not limited to using the above-described method and may be performed, for example, using a motion stereo technique with the cameras 1*a* to 1*d*.

Figure 3B:
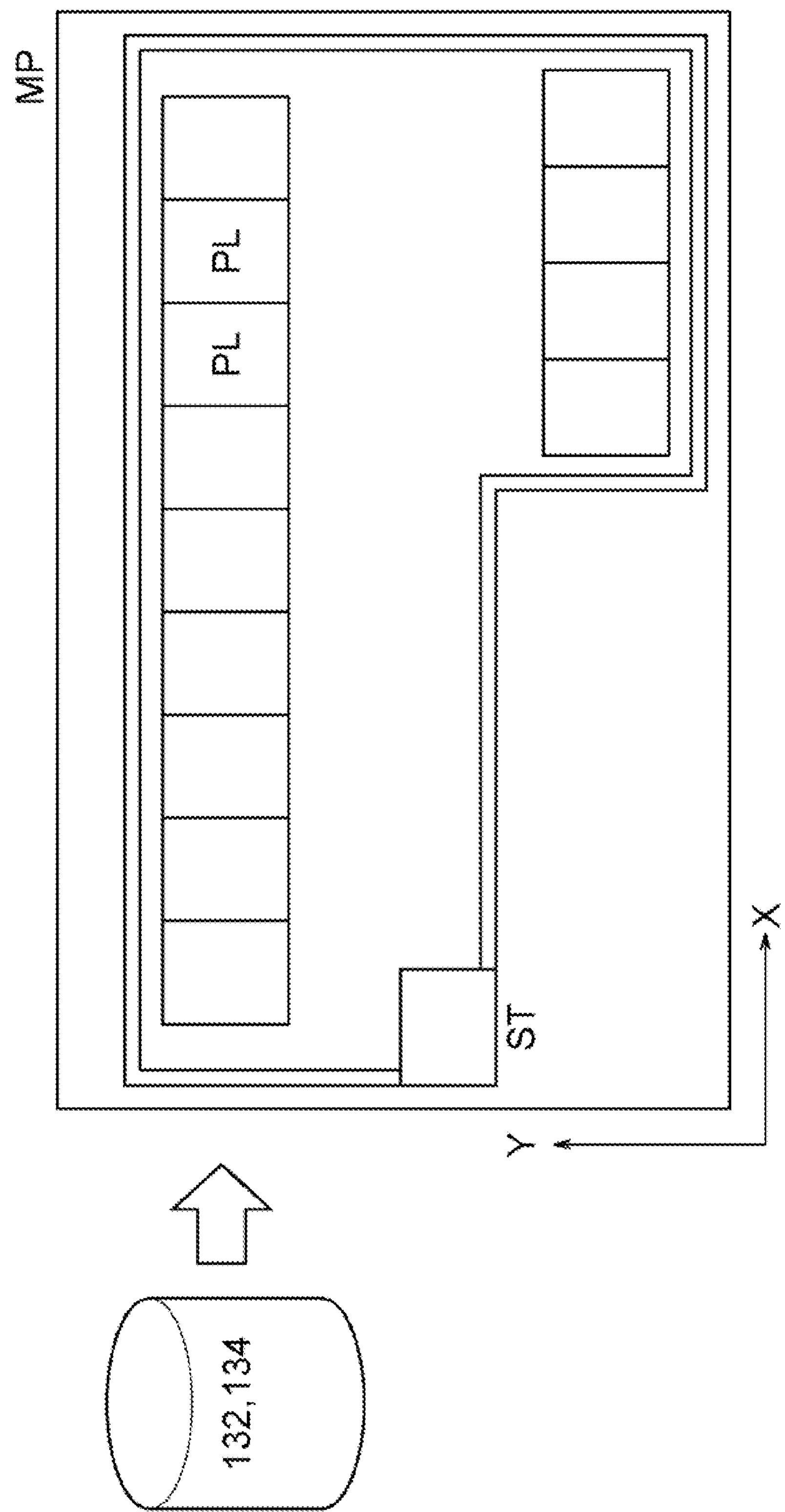
FIG. 3B is a diagram for describing a second detection scheme as an example of a detection method for an obstacle.

FIG. 3B is a diagram for describing a method of detecting obstacles including structures such as walls and pillars of a parking lot. As illustrated in FIG. 3B, the control device 10 accesses the storage device 132 of the information server 3 to acquire the parking lot information 134. The parking lot information 134 includes information on structures such as walls and pillars of a parking lot, and the control device 10 therefore detects obstacles including structures on the basis of the parking lot information 134. In FIG. 3B, a specific floor map MP of an hourly parking lot ST is illustrated as the parking lot information 134 and, in the floor map MP, the position of each parking lot PL is represented, for example, by an X coordinate and a Y coordinate.

In one or more embodiments of the present invention, the detection result by the obstacle detection process is used as a trigger for transition from the parking control to the rescue mode, but the present invention is not limited to this. The control device 10 can continuously acquire the detection result of an obstacle and use the detection result for other processes. For example, the control device 10 may use the detection result of an obstacle in the course of setting the target parking position, may use the detection result of an obstacle in the course of calculating the parking route, or may use the detection result of an obstacle in the course of calculating the rescue route, which will be described later.

The deceleration process will then be described. When detecting an obstacle while the vehicle is moving along the parking route toward the target parking position, the control device 10 forcibly decelerates the vehicle to make a stop in order to prevent the vehicle from contacting the obstacle. For example, even when the target speed moderately decreases as the vehicle approaches the target parking position in the parking control, the control device 10 increases the rate of deceleration and forcibly controls the vehicle to make a stop. Also when the parking route includes a position of turn for parking and an obstacle is detected while the vehicle is moving toward the position of turn for parking, the control device 10 controls the vehicle to make a stop.

The operator position detection process will then be described. The operator position detection process in the rescue mode is the same process as the above-described operator position detection process in the parking control, and the description will be borrowed herein.

The rescue route generation process will then be described. The rescue route refers to a route for the vehicle to leave the target parking position upon transition to the rescue mode. The control device 10 generates an evacuation route (referred to as a rescue route, hereinafter) as a route for the vehicle to move from the position at which the vehicle makes a stop to the target position (referred to as a rescue position, hereinafter) to which the vehicle moves so that at least part of the vehicle is present within the range of a boarding distance from the operator. The boarding distance refers to a distance at which the operator feels easy to board, and is a distance that is obtained experimentally. For example, the boarding distance is about 1 m, that is, about 2 or 3 steps as the stride of the operator. The method of generating the rescue route is not particularly limited.

The control device 10 according to one or more embodiments of the present invention uses the parking route calculated in the above-described parking control as the rescue route without any change. The control device 10 defines a direction in which the vehicle heads for the parking lot as the forward direction of the parking route. Then, in the rescue route generation process, the control device 10 sets a route in the reverse direction to the direction of the parking route as the rescue route. In other words, the control device 10 sets as the rescue route a route having the same trajectory as that of the parking route but in a different direction than that of the parking route, that is, a so-called reverse route of the parking route.

The route following process and the target speed generation process, which are processes for moving the vehicle along the parking route or the rescue route, will then be described. After generating the parking route or the rescue route, the control device 10 calculates a target steering angle and a target speed in order to move the vehicle along any of these routes. The control device 10 outputs the calculated target steering angle and target speed to the vehicle controller 70. When an obstacle is detected during execution of the parking control, the control device 10 forcibly reduces the target speed by the deceleration process. Methods of calculating the target steering angle and the target speed are not particularly limited, and schemes known at the time of filing the present application can be appropriately applied.

The vehicle stop process will then be described. When detecting the operator within the boarding distance from the vehicle after the vehicle moves along the rescue route, the control device 10 controls the vehicle to make a stop in accordance with the surrounding environment of the operator. Examples of the range in which the control device 10 detects the operator include a circular shape in which the center is defined as the center of gravity of the vehicle and the radius is defined as the boarding distance or a shape that covers the vehicle as a whole by expanding the shape with the boarding distance outward from an end part of the vehicle. The radius of the circle and the distance from the end part of the vehicle may be the same distance as the boarding distance or may also be a different distance from the boarding distance. For example, when detecting the operator at a distance of 1 m from the vehicle while the vehicle is moving along the rescue route, the control device 10 controls the vehicle to make a stop. When the range for detecting the operator is circular, the center of the detection range is not limited to the center of gravity of the vehicle and may also be, for example, the front part, side part, or rear part of the vehicle.

Additionally or alternatively, the control device 10 according to one or more embodiments of the present invention preliminarily detects the surrounding environment of the operator and expands the detection range for the operator in accordance with the surrounding environment. For example, when a wall as an obstacle exists around the operator, the control device 10 extends the radius from 1 m to 2 m for the circle which is the detection range for the operator. Examples of the method of detecting the surrounding environment of the operator include a method of detecting the surrounding environment on the basis of the images captured by the set of cameras 1 or the detection results from the ranging devices 2. For example, the control device 10 detects obstacles (such as a wall, another vehicle, a pedestrian, a bicycle, and a two-wheel vehicle) existing around the operator from the images captured by the set of cameras 1. The control device 10 is not limited to detecting the surrounding environment of the operator in real time. For example, the control device 10 can detect the surrounding environment of the operator also from the images captured by the set of cameras 1 when the vehicle moved along the parking route.

Additionally or alternatively, the control device 10 can acquire information on the structure of a parking facility (e.g., the width of a passage for vehicles adjacent to a parking lot) from the parking lot information 134 of the information server 3 and detect the surrounding environment of the operator by determining whether or not a wall is provided in the vicinity of the target parking position or around the passage for vehicles.

Additionally or alternatively, even when the operator is once detected within the boarding range from the vehicle, the control device 10 according to one or more embodiments of the present invention adjusts the position for the vehicle to make a stop, in accordance with the surrounding environment of the operator. Specifically, when the operator is detected within the boarding distance from the vehicle, but the vehicle can further move along the rescue route thereby to make a stop in a state in which the driver seat of the vehicle is directed to the operator, the control device 10 controls the vehicle to move along the rescue route, rather than making a stop at the time point at which the operator is detected. Then, when the vehicle has moved to the point at which the driver seat of the vehicle is directed to the operator, the control device 10 controls the vehicle to make a stop. In contrast, when the operator is detected within a predetermined range from the vehicle and the vehicle cannot make a stop in a state in which the driver seat of the vehicle is directed to the operator even if the vehicle further moves along the rescue route, the control device 10 controls the vehicle to make a stop at the time point at which the operator is detected. Examples of the scene in which the vehicle cannot make a stop with its driver seat directed to the operator include a scene in which it is difficult for the operator and the vehicle to be located side by side in the width direction of a passage for vehicles due to a narrow width of the passage.

Figure 4A:
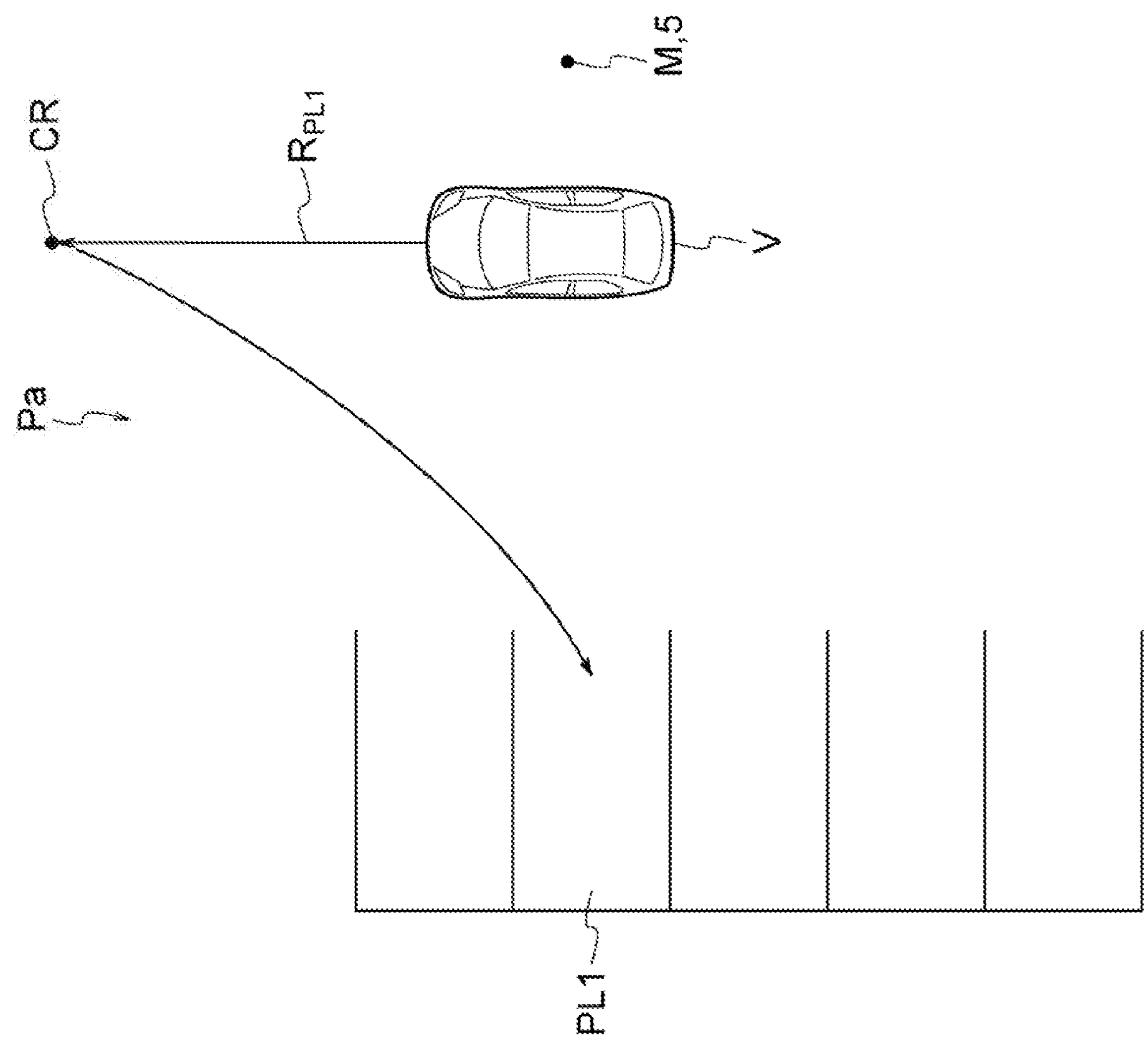
FIG. 4A is a diagram for describing an example of the operation of parking control according to one or more embodiments of the present invention.

An example of the operation in the rescue mode according to one or more embodiments of the present invention will then be described with reference to FIG. 4A and FIG. 4B. FIG. 4A is a diagram illustrating an example of the operation of the parking control and illustrates a scene in which an operator M carrying the operation terminal 5 gets off the vehicle and operates the operation terminal 5 to move the vehicle V along a parking route $R_P$. In FIG. 4A, the parking lot for parking the vehicle V is denoted by PL1, the parking route is indicated as a parking route $R_{PL1}$, the position of turn for parking included in the parking route $R_{PL1}$ is denoted by CR, and the passage for vehicles adjacent to the parking lot PL1 is indicated as a passage for vehicles $P_a$. It is assumed that the operator M carrying the operation terminal 5 is standing on the passage for vehicles $P_a$ and at a position at which the operator M can see the parking lot PL1 in the front, and observes the movement of the vehicle V.

Figure 4B:
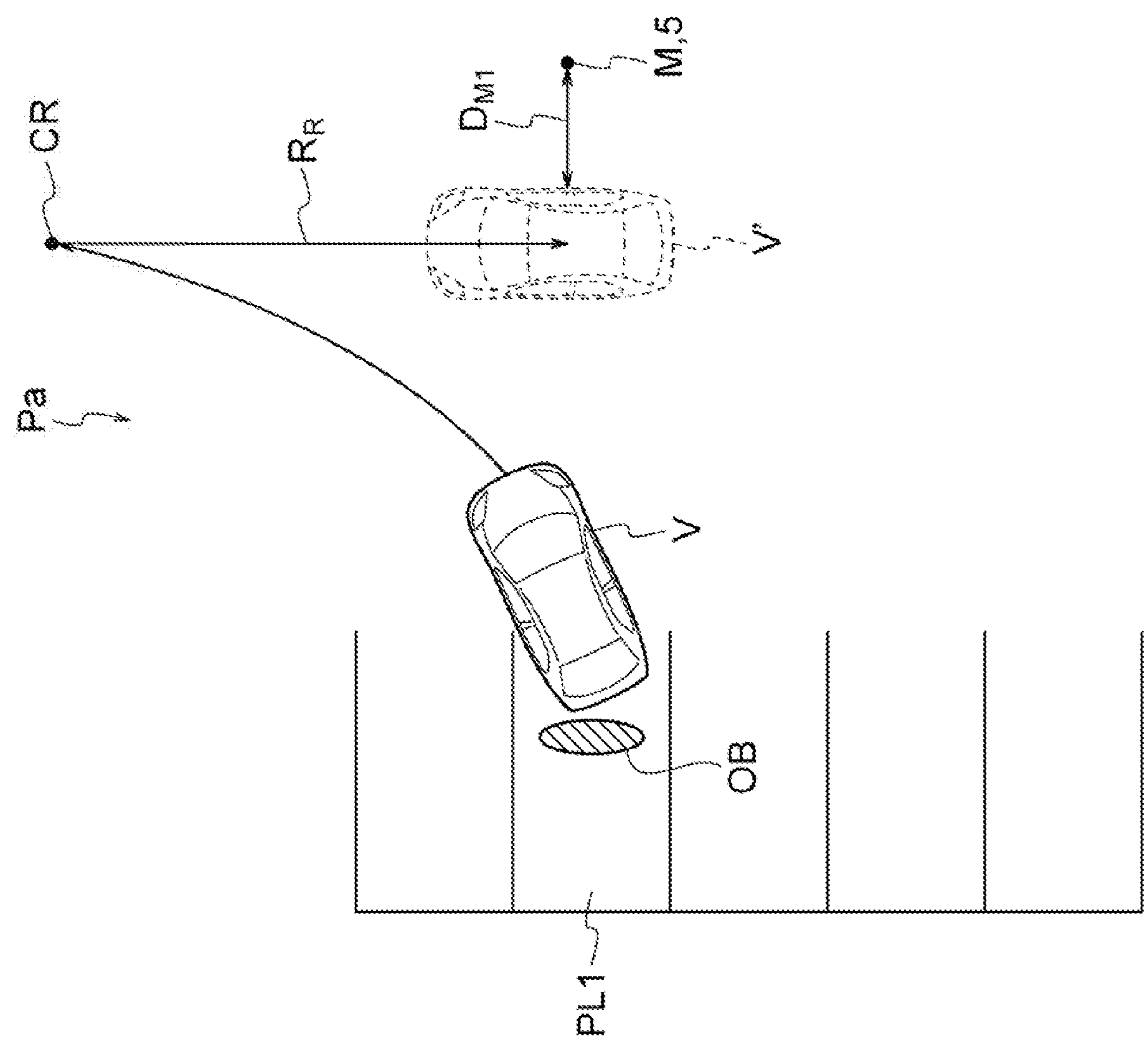
FIG. 4B is a diagram for describing the operation in a first rescue mode as an example of the operation in a rescue mode according to one or more embodiments of the present invention.

FIG. 4B illustrates a scene in which a predetermined time has elapsed from the scene illustrated in FIG. 4A. FIG. 4B illustrates a scene in which the parking control apparatus 100 detects an obstacle OB while the vehicle V is moving along the parking route $R_P$ illustrated in FIG. 4A. In this scene, the control device 10 of the parking control apparatus 100 determines that the vehicle V cannot be parked into the parking lot PL1 and controls the display 53 of the operation terminal 5 to present information that enables the transition to the rescue mode in order to allow the operator of the operation terminal 5 to select whether or not to transition to the rescue mode. It is assumed that the operator selects the rescue mode and presses the enter button of the operation terminal 5.

After transition to the rescue mode, first, the control device 10 detects the position of the operator M. For example, the control device 10 detects the position of the operator M using any of the methods described with reference to FIG. 2A to FIG. 2C or a combination of such methods. The control device 10 detects the position of the operator M at the timing at which the vehicle V makes a stop.

Then, the control device 10 generates a rescue route using the parking route along which the vehicle V has moved during the parking control. In the example of FIG. 4B, the control device 10 determines as the rescue route a route having the same trajectory as that of the parking route $R_{PL1}$ illustrated in FIG. 4A but in the opposite direction to the parking route $R_{PL1}$. The control device 10 treats the direction indicated by the parking route $R_{PL1}$ as the forward direction and the direction indicated by a rescue route $R_R$ as the reverse direction. Then, to determine the detection range for the operator M, the control device 10 acquires a distance $D_{M1}$ from the memory such as the ROM 12.

Then, the control device 10 calculates a target steering angle and a target speed for moving the vehicle V along the rescue route $R_R$ and outputs the calculated target steering angle and target speed to the vehicle controller 70. The vehicle V starts moving along the rescue route $R_R$. This allows the vehicle V to evacuate from the obstacle OB and the parking lot PL1.

When the vehicle V starts moving along the rescue route $R_R$, the control device 10 determines whether or not the operator M is present within the range of the distance $D_{M1}$ or less from the vehicle V. In the example of FIG. 4B, when the vehicle V moves along the rescue route $R_R$ and arrives at the position indicated by a vehicle V', the control device 10 detects the presence of the operator M within the distance $D_{M1}$ or less (e.g., about 1 m) from the vehicle V' and controls the vehicle V to make a stop. The distance $D_{M1}$ is not limited to being preliminarily stored in a memory such as the ROM 12, and the control device 10 can change the distance $D_{M1}$ in accordance with the type, size, and the like of the vehicle V.

Figure 4C:
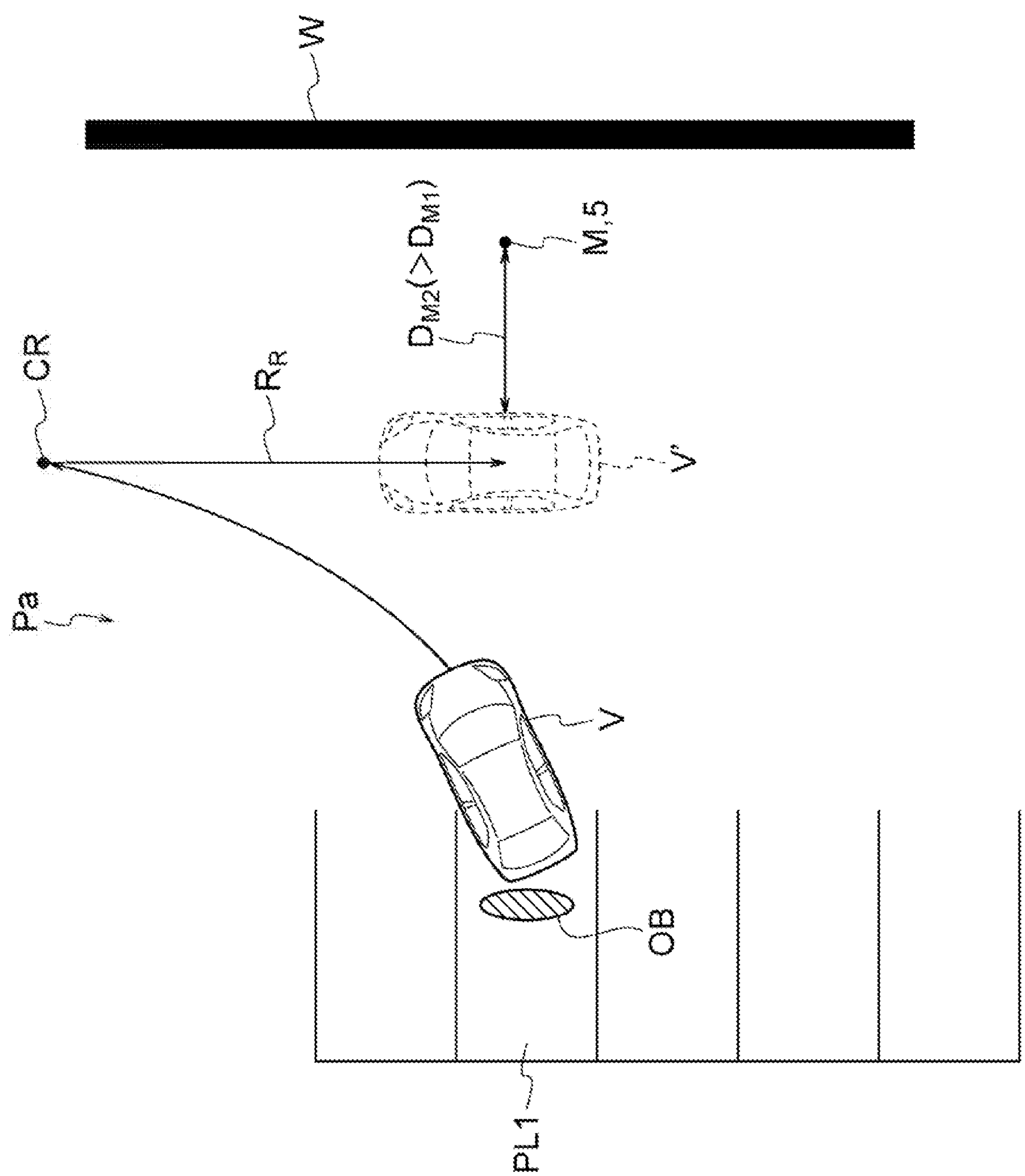
FIG. 4C is a diagram for describing the operation in a second rescue mode as an example of the operation in a rescue mode according to one or more embodiments of the present invention.
Figure 4D:
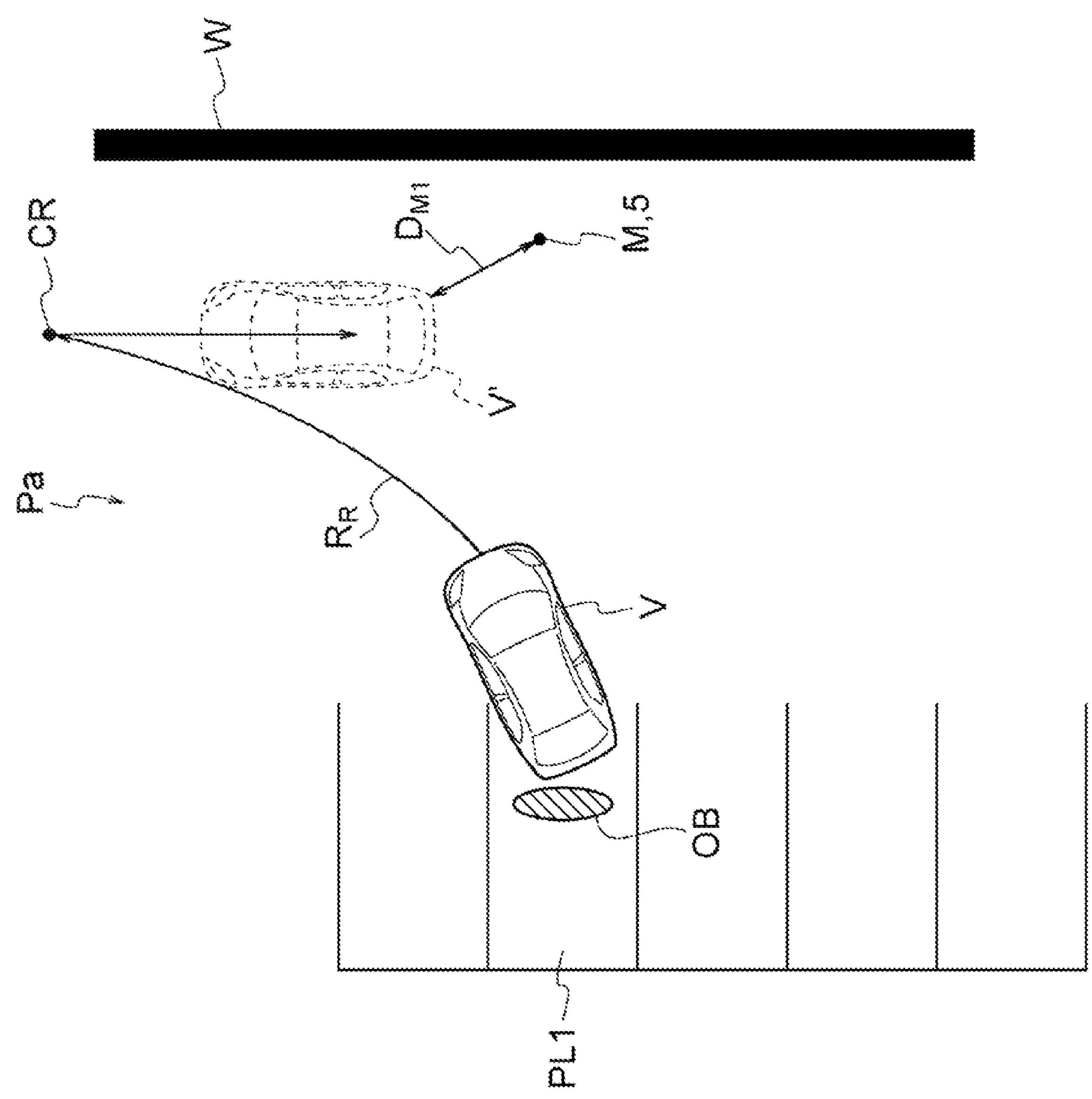
FIG. 4D is a diagram for describing the operation in a third rescue mode as an example of the operation in a rescue mode according to one or more embodiments of the present invention.

Other examples of the operation in the rescue mode according to one or more embodiments of the present invention will then be described with reference to FIGS. 4C and 4D. FIGS. 4C and 4D illustrate similar scenes to that in FIG. 4B, but the surrounding environment of the operator M is different between FIGS. 4C and 4D and FIG. 4B.

In the example of FIG. 4C, there is a wall W as an obstacle around the operator M, and the range in which the operator M can move is limited. After transition to the rescue mode, the control device 10 detects the position of the operator M and sets the rescue route $R_R$ as in the example of FIG. 4B.

Then, the control device 10 detects that the wall W provided along the passage for vehicles $P_a$ exists around the operator M. For example, the control device 10 accesses the information server 3 to acquire information on the structure of the parking facility (e.g., the passage width of the passage for vehicles $P_a$) from the parking lot information 134 and determines whether or not the wall W is provided around the parking lot PL1 or around the passage for vehicles $P_a$. Additionally or alternatively, for example, the control device 10 detects the wall W provided around the operator M on the basis of the images captured by the set of cameras 1 or the detection results from the ranging devices 2.

Then, the control device 10 acquires the distance $D_{M1}$ (e.g., about 1 m) from a memory such as the ROM 12 and sets a distance $D_{M2}$ (>distance $D_{M1}$) extended from the distance $D_{M1}$ by a predetermined distance. The control device 10 calculates a target steering angle and a target speed for moving the vehicle V along the rescue route $R_R$ and outputs the calculated target steering angle and target speed to the vehicle controller 70. The vehicle V starts moving along the rescue route $R_R$. The difference between the distance $D_{M1}$ and the distance $D_{M2}$ is a distance at which the operator does not feel a sense of pressure against the vehicle approaching even when there is an obstacle around the operator, and is a distance that is obtained experimentally.

In the example of FIG. 4C, when the vehicle V starts moving along the rescue route $R_R$, the control device 10 determines whether or not the operator M is present within the range of the distance $D_{M2}$ or less from the vehicle V. In the example of FIG. 4C, when the vehicle V moves along the rescue route $R_R$ and arrives at the position indicated by a vehicle V', the control device 10 detects the presence of the operator M within the distance $D_{M2}$ or less (e.g., about 2 or 3 m) from the vehicle V' and controls the vehicle V to make a stop.

In the example of FIG. 4C, the control device 10 sets the distance from the operator M to the distance $D_{M2}$ longer than the distance $D_{M1}$ illustrated in the example of FIG. 4B and controls the vehicle V to make a stop at a position separated from the operator M by the distance $D_{M2}$. This allows the vehicle V to make a stop at a distance away from the operator M to a certain extent, and the sense of pressure given to the operator M can thus be alleviated even when the vehicle V approaches the operator M in a situation in which the moving range of the operator M is limited, such as due to the existence of the wall W around the operator M.

In the example of FIG. 4D, as in FIG. 4C, there is a wall W as an obstacle around the operator M, and the range in which the operator M can move is limited. In the example of FIG. 4D, it is assumed that the passage width of the passage for vehicles $P_a$ is narrower than the passage width of the passage for vehicles $P_a$ illustrated in FIG. 4C. After transition to the rescue mode, the control device 10 detects the position of the operator M and sets the rescue route $R_R$ as in the example of FIG. 4B. In this operation, the control device 10 perceives the positional relationship between the position of the operator M and the rescue route $R_R$ and determines whether or not the vehicle V can make a stop in a state in which the driver seat of the vehicle V is directed to the operator M.

For example, when the position of the operator M is located on the rescue route $R_R$, it is highly possible that the operator M is present on the trajectory along which the vehicle V moves, and the control device 10 therefore determines that the vehicle V cannot make a stop in a state in which the driver seat of the vehicle V is directed to the operator M. This determination is not limited to being made by the method of determining from the positional relationship between the position of the operator M and the rescue route $R_R$. For example, from the passage width of the passage for vehicles $P_a$, a determination may be made as to whether or not the vehicle V can make a stop in a state in which the driver seat of the vehicle V is directed to the operator M. For example, the control device 10 accesses the information server 3 to acquire information on the passage width of the passage for vehicles $P_a$ from the parking lot information 134. Then, when the difference between the distance from the current position of the vehicle V to the passage for vehicles $P_a$ and the acquired passage width of the passage for vehicles $P_a$ is not larger than a predetermined threshold, the control device 10 may determine that the moving range of the vehicle V is limited and that the vehicle V cannot make a stop in a state in which the driver seat of the vehicle V is directed to the operator M.

In the example of FIG. 4D, the control device 10 determines that the passage width of the passage for vehicles $P_a$ is narrow and the vehicle V cannot make a stop in a state in which the driver seat of the vehicle V is directed to the operator M.

Then, the control device 10 acquires the distance $D_{M1}$ (e.g., about 1 m) from a memory such as the ROM 12, calculates a target steering angle and a target speed for moving the vehicle V along the rescue route $R_R$, and outputs the calculated target steering angle and target speed to the vehicle controller 70. The vehicle V starts moving along the rescue route $R_R$.

In the example of FIG. 4D, when the vehicle V starts moving along the rescue route $R_R$, a determination is preliminarily made that the vehicle V cannot make a stop in a state in which the driver seat of the vehicle V is directed to the operator M, and the control device 10 therefore sets the rear part of the vehicle V as a reference for the detection range for the operator M and determines whether or not the operator M is present within the range of the distance $D_{M1}$ or less from the rear part of the vehicle V. In the example of FIG. 4D, when the vehicle V moves along the rescue route $R_R$ and arrives at the position indicated by a vehicle V', the control device 10 detects the presence of the operator M within the distance $D_{M1}$ or less (e.g., about 1 m) from the rear part of the vehicle V' and controls the vehicle V to make a stop.

In the example of FIG. 4D, a determination is preliminarily made that the vehicle V cannot make a stop just beside the operator M, and the control device 10 therefore sets the rear part of the vehicle V as a reference for the detection range for the operator M. This allows the vehicle V to make a stop as close as possible to the operator M even in a situation in which the width of the passage for vehicles is narrow and the vehicle cannot make a stop just beside the operator.

A method of controlling the vehicle to make a stop at a position at which the distance between the vehicle and the operator is approximately the shortest will then be described with reference to FIGS. 5A and 5B. In one or more embodiments of the present invention, examples have been described in which the vehicle is controlled to make a stop at the timing at which the operator is detected within the predetermined boarding distance, but the timing to stop the vehicle is not limited to this. For example, the control device 10 may control the vehicle to make a stop at the timing at which it is detected that the distance between the vehicle and the operator is approximately the shortest.

Figure 5A:
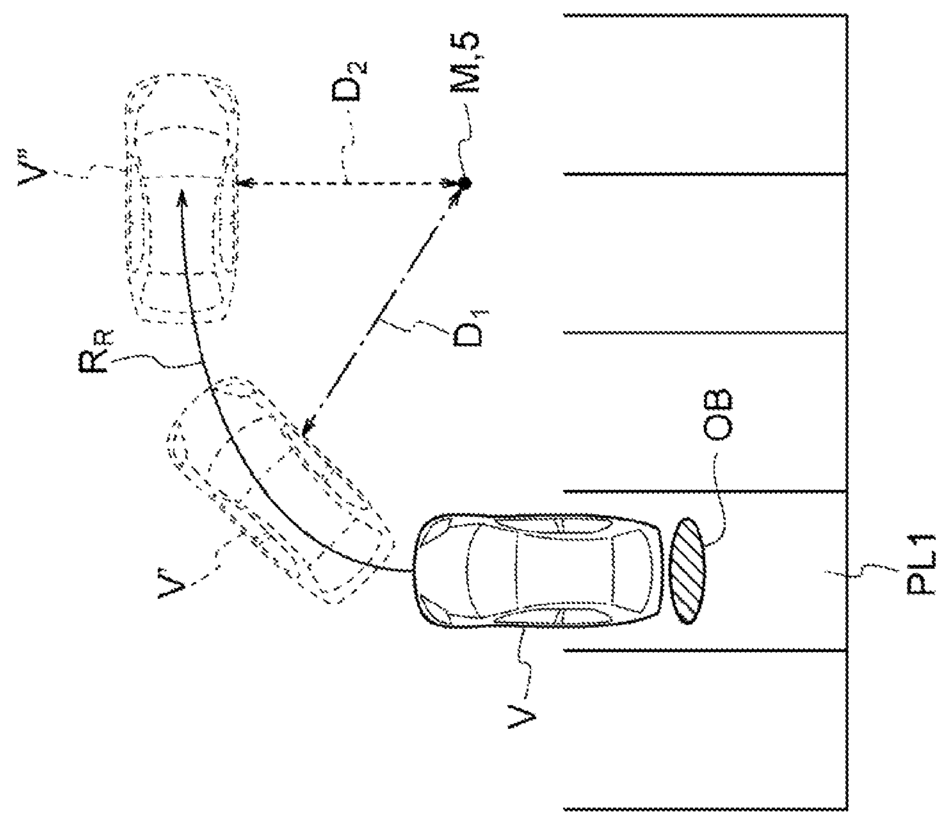
FIG. 5A is a diagram for describing a method of stopping a vehicle at a position at which the distance between the vehicle and an operator is approximately the shortest.

FIG. 5A illustrates a scene of transition to the rescue mode due to detection of an obstacle OB during execution of the parking control for parking the vehicle V into the parking lot PL1. The control device 10 detects the position of the operator M and starts movement of the vehicle V along the rescue route $R_R$. In FIG. 5A, vehicle V' and vehicle V" each represent a state in which the vehicle is moving along the rescue route $R_R$. The distance between the operator M and the vehicle V' is indicated by a distance D1 while the distance between the operator M and the vehicle V''' is indicated by a distance D2. FIG. 5B is a graph illustrating the relationship between the distance between the vehicle and the operator and time in the scene illustrated in FIG. 5A. FIG. 5B illustrates that at time t1, the vehicle V moves to the position of the vehicle V' illustrated in FIG. 5A and the distance between the vehicle V' and the operator M is a distance $D_{M1}$. FIG. 5B also illustrates that at time t2, the vehicle V moves to the position of the vehicle V" illustrated in FIG. 5A and the distance between the vehicle V" and the operator M is a distance $DM_2$.

When the vehicle starts moving along the rescue route, the control device 10 continuously detects the position of the operator and continuously calculates the distance between the vehicle and the operator. For example, the control device 10 continuously acquires the images captured by the set of cameras 1 or the detection results from the ranging devices 2 and calculates the distance between the moving vehicle and the operator.

Then, when detecting that the distance between the vehicle and the operator has switched from the decreasing direction to the increasing tendency, the control device 10 determines that the distance between the vehicle and the operator becomes approximately the shortest and the vehicle has moved to an optimal position at which the operator can easily get on the vehicle, and controls the vehicle to make a stop. For example, the control device 10 calculates the amount of change in the calculated distance between the vehicle and the operator at a predetermined cycle. When the amount of change is a negative value, the control device 10 determines that the distance is in a decreasing tendency, while when the amount of change is a positive value, the control device 10 determines that the distance is in an increasing tendency. In other words, the control device 10 can determine whether the vehicle is approaching the operator or moving away from the operator on the basis of the calculated amount of change in the distance.

Figure 5B:
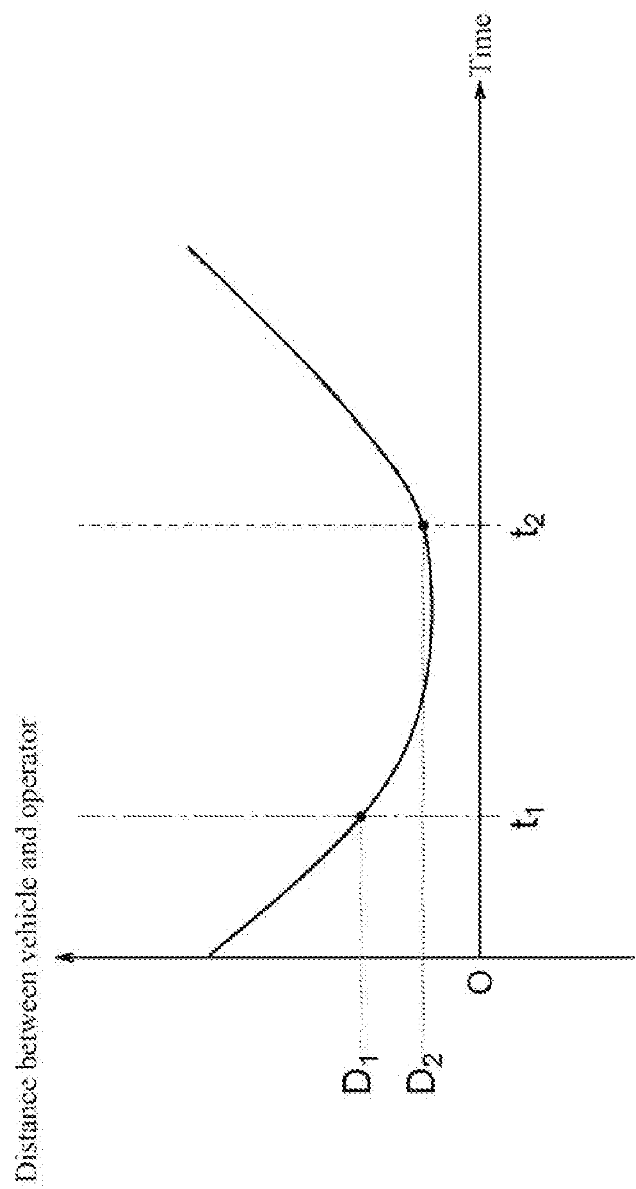
FIG. 5B is a graph for describing the method of stopping the vehicle at the position at which the distance between the vehicle and the operator is approximately the shortest.

In the example of FIGS. 5A and 5B, at time t1 the control device 10 does not control the vehicle to make a stop because the distance between the vehicle V and the operator M (distance $D_1$) is in the course of decreasing tendency, and at time t2, the control device 10 controls the vehicle to make a stop because the distance between the vehicle V and the operator M (distance D2) switches to the increasing tendency. The method of detecting the approximately shortest distance from the vehicle to the operator M is not limited to the above-described method, and schemes known at the time of filing the present application can be appropriately applied.

The control procedure of the parking control will be described below with reference to a flowchart illustrated in FIG. 6. FIG. 6 is a flowchart illustrating the control procedure of a parking control process executed by the parking control system 1000 according to one or more embodiments of the present invention. The start trigger for the parking control process is not particularly limited, and the parking control process may be triggered by operating a start switch of the parking control apparatus 100.

In step S101, the control device 10 of the parking control apparatus 100 acquires information around the vehicle. The control device 10 acquires, as needed, the ranging signals from the ranging devices 2 attached to multiple sites of the vehicle. Additionally or alternatively, the control device 10 acquires, as needed, images captured by the cameras 1*a* to 1*d* attached to multiple sites of the vehicle. Acquisition of the ranging signals from the ranging devices 2 and acquisition of the captured images from the set of cameras 1 may be selectively performed.

In step S102, the control device 10 detects available parking spaces. The control device 10 detects frames (areas) of parking spaces on the basis of the images captured by the cameras 1*a* to 1*d*. The control device 10 detects empty parking spaces using the detection data from the ranging devices 2 and/or the detection data extracted from the captured images. The control device 10 detects available parking spaces from among the parking spaces. The available parking spaces are parking spaces which are empty (i.e., other vehicles are not parked) and to which routes for completing the parking can be calculated. In one or more embodiments of the present invention, the condition that a parking route can be calculated means that a trajectory of the route from the current position to a target parking position can be rendered on the road surface coordinates without interfering with obstacles (including parked vehicles).

In step 103, the control device 10 transmits the available parking spaces to the operation terminal 5, controls the display 53 of the operation terminal 5 to display the available parking spaces, and requests the operator to input selection information of the target parking position for parking the vehicle. The target parking position may be automatically selected by the control device 10 or the parking facility side. When the operation command of specifying an available parking space is input to the operation terminal 5, the available parking space is set as the target parking position.

In one or more embodiments of the present invention, the operator performs a so-called remote parking process in which the operator gets off the vehicle and parks the vehicle from outside. In step S104, the operator of the operation terminal 5 and other occupants of the vehicle get off the vehicle. The operator who gets off the vehicle inputs operation information regarding the parking process to the operation terminal 5. The operation information includes at least a start instruction for the parking process. The operation information is transmitted to the control device 10.

In step S105, the control device 10 detects the position of the operator. The control device 10 detects the position of the operator, for example, by any of the methods described with reference to FIGS. 2A to 2C. For example, when detecting the operator from the captured images from the set of cameras 1 or the detection data from the ranging devices 2, the control device 10 detects the relative position of the operator with respect to the vehicle.

In step S106, the control device 10 calculates the parking route to the target parking position. The parking route includes a position of turn for parking required to move to the available parking space. For this calculation, the parking route is defined as a line and is also defined as a strip-shaped area corresponding to the occupied area by the vehicle based on the vehicle width. The occupied area by the vehicle is defined with consideration for the vehicle width and a margin width ensured for movement. The control device 10 generates a control instruction for moving the vehicle along the calculated parking route. The control device 10 controls the display 53 of the operation terminal 5 to display the parking route and encourages the operator to confirm it.

In step S107, the control device 10 starts execution of the parking control when the operator confirms the parking route and inputs the execution instruction to the operation terminal 5. This allows the vehicle to start moving along the parking route toward the target parking position.

In step S108, the control device 10 determines whether or not an obstacle is detected on or near the parking route. The control device 10 continuously acquires the captured images from the set of cameras 1 and/or the detection data from the ranging devices 2 to determine whether or not an obstacle exists around the vehicle. When an obstacle is detected, the process proceeds to step S109, while when no obstacle is detected, the process proceeds to step S112.

In step S109, the control device 10 controls the vehicle to make a stop in order to avoid contact between the vehicle and the obstacle. For example, the control device 10 acquires the distance from the vehicle to the obstacle detected in step S108 and calculates the deceleration for the target speed in accordance with the acquired distance. Then, the control device 10 forcibly reduces the target speed to stop the vehicle.

In step S110, the control device 10 controls the display 53 of the operation terminal 5 to present information that enables the transition to the rescue mode in order to allow the operator to select whether or not to transition to the rescue mode. For example, the display 53 displays information that the vehicle has stopped due to the detection of an obstacle and information that enables the transition to the rescue mode, and the operator can select the rescue mode and operate the enter button thereby to achieve the transition to the rescue mode. Transition to the rescue mode is followed by step S111, while no transition to the rescue mode is followed by step S112.

In step S111, the control device 10 starts control for making the vehicle stopped in step S109 leave the obstacle and the target parking position. The operation after the transition to the rescue mode will be described later.

On the other hand, when the parking route calculated in step S106 includes a position of turn for parking, the control device 10 makes a determination in step S112 as to whether or not the vehicle has reached the position of turn for parking. For example, the control device 10 makes the determination by comparing the current position of the vehicle with the position of turn for parking. When a determination is made that the vehicle has reached the position of turn for parking, the process proceeds to step S113, while when a determination is made that the vehicle has not reached the position of turn for parking, the process returns to step S108.

In step S113, the control device 10 executes a gear shift included in the control instruction. Thereafter, the control device 10 completes the parking control by continuously executing the control instruction in step S114. When the parking route calculated in step S106 does not include a position of turn for parking, steps S112 and S113 may be omitted.

Figure 7:
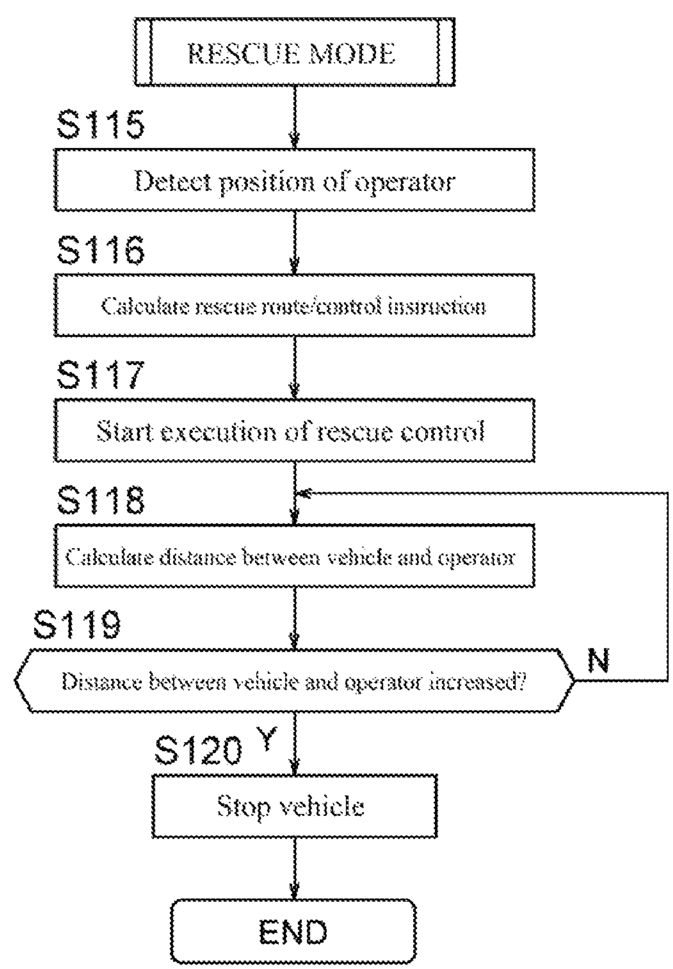
FIG. 7 is a flowchart illustrating an example of a control procedure in a rescue mode according to one or more embodiments of the present invention.

The control procedure in the rescue mode will then be described with reference to a flowchart illustrated in FIG. 7. When the execution of the rescue mode is determined by the operator in step S110 illustrated in FIG. 6, the control device 10 detects the position of the operator in step S115. The method of detecting the position of the operator may be the same method as the detection method in step S105 illustrated in FIG. 6 or may also be a different method. In this step, the control device 10 may detect the position of the operator and an obstacle such as a wall existing around the operator.

In step S116, the control device 10 calculates the rescue route. The control device 10 sets as the rescue route a route having the same trajectory as that of the parking route calculated in step S106 illustrated in FIG. 6 but in the opposite direction to the direction of the parking route. For example, when calculating the parking route $R_{PL1}$ illustrated in the example of FIG. 4A in step S106, the control device 10 sets the reverse route of the parking route $R_{PL1}$ as the rescue route $R_R$ as illustrated in the example of FIG. 4B. The control device 10 controls the display 53 of the operation terminal 5 to display the rescue route and encourages the operator to confirm it.

In step S117, the control device 10 starts execution of the rescue control when the operator confirms the rescue route and inputs the execution instruction to the operation terminal 5. This allows the vehicle to start moving along the rescue route toward the rescue position.

In step S118, the control device 10 calculates the distance between the vehicle and the operator. For example, the control device 10 determines the direction in which the operator is present with respect to the position of the moving vehicle and the distance between the vehicle and the operator on the basis of the images captured by the set of cameras 1 and the detection results from the ranging devices 2. Then, the control device 10 temporarily stores the calculated distance in a RAM. In step S118, the process of calculating the distance from the vehicle to the operator and the process of temporarily storing the calculated distance may be repeatedly performed at a predetermined cycle.

In step S119, the control device 10 determines whether or not the distance from the vehicle to the operator calculated in step S118 has increased. The control device 10 detects a temporal change in the distance calculated in step S118 and determines whether or not the distance has increased. For example, the control device 10 calculates the difference between the distance calculated in step S118 and the distance temporarily stored before the elapse of a predetermined cycle in step S118. Then, the control device 10 determines whether or not the distance from the vehicle to the operator has increased in accordance with whether the calculated difference is a positive value or a negative value. When the difference is a negative value, the control device 10 determines that the distance from the vehicle to the operator is decreasing, while when the difference is a positive value, the control device 10 determines that the distance from the vehicle to the operator is increasing. When a determination is made that the distance from the vehicle to the operator is decreasing, the process returns to step S118, while when a determination is made that the distance from the vehicle to the operator is increasing, the process proceeds to step S120.

In step S120, the control device 10 determines that the vehicle may move away from the operator if the vehicle further moves along the rescue route, because the distance from the vehicle to the operator increases, and controls the vehicle to make a stop. As long as the vehicle is approaching the operator, a determination is made in step S119 that the distance from the vehicle to the operator is decreasing, and the process returns to step S118; therefore, at the timing of detecting that the vehicle moves away from the operator, the process proceeds from step S119 to step S120. Accordingly, at the timing of controlling the vehicle to make a step in step S120, the distance from the vehicle to the operator is approximately the shortest distance. When the process of step S120 is completed, the parking control process is concluded.

As described above, the parking control method for a vehicle according to one or more embodiments of the present invention includes, when the parking control to the target parking position is suspended and the vehicle leaves the target parking position, moving the vehicle so that the vehicle is present within a range of about 1 m from the operator. This allows the vehicle to evacuate from the initial target parking position and make a stop at a position at which the operator can easily get on the vehicle and it is therefore possible to prevent the operator of the operation terminal 5 from moving to the stop position of the vehicle and alleviate the burden imposed on the operator of the operation terminal 5.

In the parking control method for a vehicle according to one or more embodiments of the present invention, the parking control is performed by moving the vehicle along the parking route in which the direction from the current position of the vehicle to the target parking position is the forward direction. Then, when the parking control to the target parking position is suspended due to the detection of an obstacle or the like and the vehicle leaves the target parking position, the rescue route is set as a route having the same trajectory as that of the parking route but in the opposite direction to the parking route, and the vehicle is controlled to move along the rescue route. Moreover, when the operator is detected within a predetermined range from the vehicle moving along the rescue route, the vehicle is controlled to make a stop. The vehicle can thus be controlled to make a stop near the operator without newly performing the calculation of a trajectory or the like as the rescue route because the rescue route is set using the parking route.

In the parking control method for a vehicle according to one or more embodiments of the present invention, as the vehicle moves along the rescue route, the distance between the vehicle and the operator is continuously calculated, and when the calculated distance switches from the decreasing tendency to the increasing tendency, the vehicle is controlled to make a stop. The operator can easily get on the vehicle because the vehicle is controlled to make a stop as close as possible to the operator.

In the parking control method for a vehicle according to one or more embodiments of the present invention, when the width of a passage for vehicles is narrow and the vehicle cannot make a stop in a state in which the driver seat of the vehicle is directed to the operator, that is, when the vehicle approaches the operator with the rear part facing the operator as the vehicle moves along the rescue route, the vehicle is controlled to make a stop upon detection of the operator within a predetermined range from the rear part of the vehicle. This allows the vehicle to make a stop as close as possible to the operator even in a situation in which the vehicle cannot make a stop in a state in which the driver seat of the vehicle is directed to the operator, such as due to a narrow width of a passage for vehicles.

In the parking control method for a vehicle according to one or more embodiments of the present invention, the detection range for the operator is expanded in accordance with the surrounding environment of the operator so that the operator can be easily detected. Specifically, when an obstacle exists around the operator, the predetermined range is expanded as compared with when no obstacle exists, and the vehicle is controlled to make a stop by detecting the operator earlier than when no obstacle exists. This allows the vehicle to make a stop near the operator while alleviating the sense of pressure given to the operator even in a scene in which the movement of the operator is limited due to the existence of an obstacle.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the present invention has been described by exemplifying a case in which the reverse route of the parking route is used as the rescue route, but the present invention is not limited to using the trajectory of the parking route as the rescue route, and the rescue route may be generated as a new route different from the parking route in accordance with the position of the operator.

Figure 8:
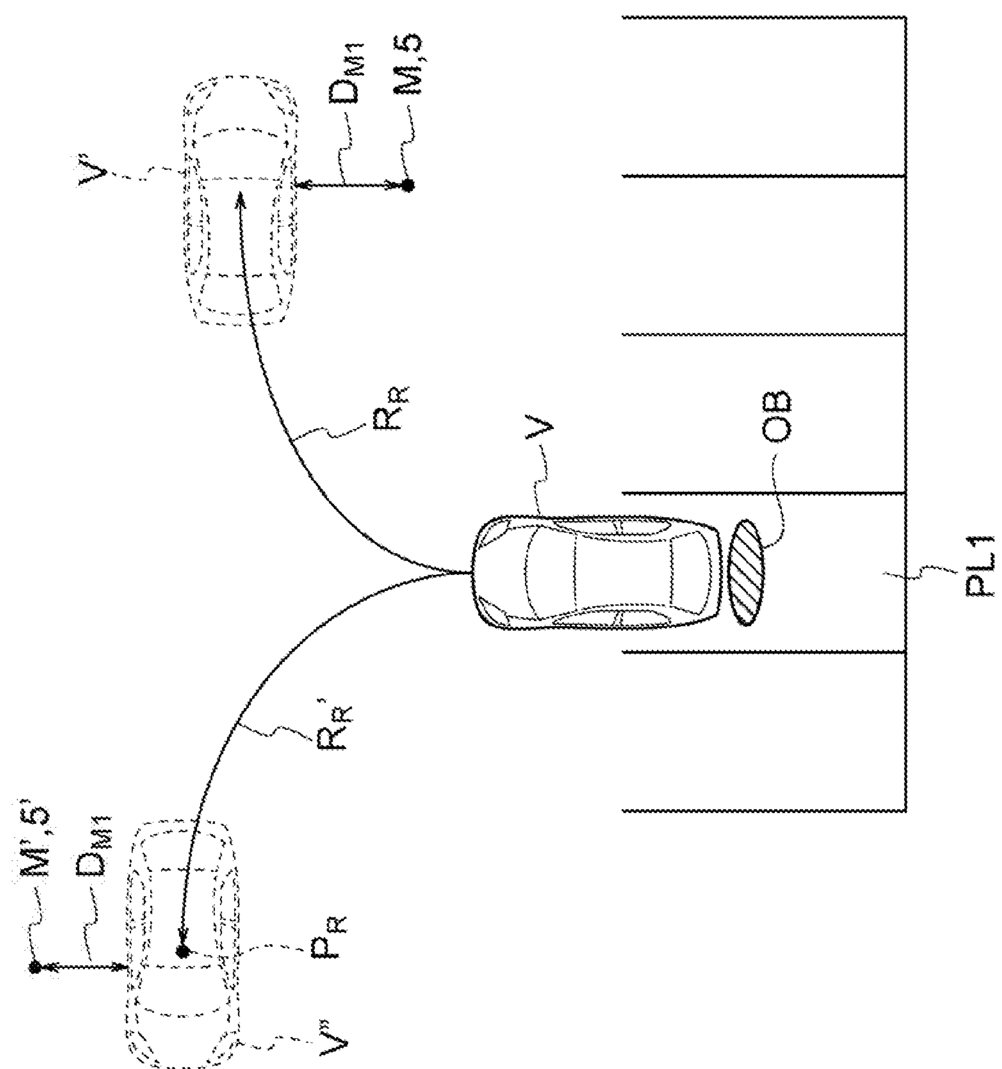
FIG. 8 is a diagram for describing the operation in a fourth rescue mode as an example of the operation in a rescue mode according to one or more embodiments of the present invention.

An example of the operation in the rescue mode in which a new rescue route is generated in accordance with the position of the operator will be described with reference to FIG. 8. As in FIG. 4A to FIG. 4D, FIG. 8 illustrates a scene in which the obstacle OB is detected while the parking control apparatus 100 is executing the parking control for parking the vehicle V backward into the parking lot PL1. In this scene, the control device 10 determines that the vehicle V cannot be parked into the parking lot PL1, and determines the transition to the rescue mode on the basis of an operation command from the operator. In FIG. 8, it is assumed that the operator M stands at the position illustrated in FIG. 5 and achieves execution of the parking control while observing the parking lot PL1 and, as in the example of FIG. 4B, the rescue route $R_R$ is the reverse route of the parking route (not illustrated).

After transition to the rescue mode, the control device 10 detects the position of the operator. When the operator M is present at the position illustrated in FIG. 8, the control device 10 sets the reverse route of the parking route as the rescue route $R_R$ and controls the vehicle V to move along the rescue route $R_R$. When the vehicle V starts moving along the rescue route $R_R$ and the distance from the vehicle V to the operator M becomes approximately the shortest distance (distance $D_{M1}$), the control device 10 controls the vehicle to make a stop. In this case, the vehicle V moves to the position of the vehicle V' and makes a stop with the driver seat of the vehicle V' directed to the operator M.

Additionally or alternatively, it is assumed that the operator M moves to the position of an operator M' illustrated in FIG. 8 while the parking control is being executed or after the obstacle OB is detected and the vehicle V makes a stop. In this case, the control device 10 detects the position of the operator M', recognizes that the operator M has moved from the right side to the left side as viewed from the vehicle V, and determines that the vehicle V cannot make a stop with the driver seat of the vehicle V directed to the operator M' even when the vehicle V is controlled to move in the opposite direction along the parking route. In this case, the control device 10 generates a new route different from the parking route. For example, the control device 10 sets the rescue position as a position to stop the vehicle within the boarding distance from the position of the operator M' and generates the rescue route from the current position of the vehicle to the rescue position. In the example of FIG. 8, the control device 10 generates a rescue route $R_R'$ from the position of the vehicle V to the rescue position $P_R$. Then, the control device 10 controls the vehicle V to move to the rescue position $P_R$ along the rescue route $R_R'$. In FIG. 8, the state of the vehicle V after making a stop with the driver seat directed to the operator M' is indicated as a vehicle V".

The present invention is not limited to generating the rescue route $R_R'$ after setting the rescue position $P_R$, and another configuration may be used, for example, in which a route for the vehicle to turn to the left side while moving forward is generated, the vehicle is controlled to move along the generated route, and the vehicle V is controlled to make a stop when the operator M" is detected within a predetermined range (within the distance $D_{M1}$) from the moving vehicle.

Thus, in the parking control according to one or more embodiments of the present invention, a rescue route may be newly generated in accordance with the position of the operator, the vehicle is controlled to move along the rescue route, and the vehicle is controlled to make a stop with the driver seat directed to the operator. Depending on the position of the operator, the vehicle can make a stop at a position near the operator while the driver seat of the vehicle is directed to the operator, and it is therefore possible to prevent the operator from performing unnecessary movement, such as going around from the side opposite to the driver seat to move to the driver seat side in order to get on the vehicle. As a result, the operator can easily get on the vehicle.

Moreover, as illustrated in the example of FIG. 4D, in a situation in which the vehicle cannot make a stop with the driver seat directed to the operator, the vehicle approaches the operator with the rear part facing the operator. For this reason, the above one or more embodiments of the present invention have been described by exemplifying the case in which the vehicle is controlled to make a stop when the control device 10 detects the operator within the predetermined range from the rear part of the vehicle, but the present invention is not limited to this. For example, when the vehicle approaches the operator with the front part facing the operator, the control device 10 may control the vehicle to make a stop upon detection of the operator within a predetermined range from the front part of the vehicle.

Moreover, in the above-described embodiments, for example, the present invention has been described by exemplifying a case in which the map information 133 and the parking lot information 134 are stored in the storage device 132 of the information server 3, but the present invention is not limited to this. For example, such information may be stored in the ROM 12 or RAM 13 of the parking control apparatus 100.

DESCRIPTION OF REFERENCE NUMERALS

1000 Parking control system
100 Parking control apparatus
10 Control device
11 CPU
12 ROM
13 RAM
20 Input device
21 Communication device
211 Antennas
30 Output device
31 Display

1*a*-1*d* Cameras
2 Ranging devices
3 Information server
131 Communication device
132 Storage device
133 Map information
134 Parking lot information
5 Operation terminal
51 Communication device
511 Antenna
52 Input device
53 Display
200 Onboard apparatus
40 Drive system
50 Steering angle sensor
60 Vehicle speed sensor
70 Vehicle controller
71 CPU
72 ROM
73 RAM

The invention claimed is:

1. A parking control method comprising:

performing parking control of moving a vehicle along a parking route generated by a parking route generation process to a target parking position on a basis of an operation command acquired from an operator located outside the vehicle;

detecting a position of the operator; and when the parking control to the target parking position is suspended and the vehicle leaves the target parking position, moving the vehicle so that at least part of the vehicle is present within a predetermined range from the operator.

2. The parking control method according to claim 1, comprising:

performing the parking control by moving the vehicle along the parking route in which a direction from a current position of the vehicle to the target parking position is a forward direction;

when the parking control to the target parking position is suspended and the vehicle leaves the target parking position, moving the vehicle in a reverse direction along the parking route; and when detecting the operator within the predetermined range, stopping the vehicle.

3. The parking control method according to claim 1, comprising:

continuously calculating a distance between the vehicle and the operator; and when the calculated distance switches from a decreasing tendency to an increasing tendency, stopping the vehicle.

4. The parking control method according to claim 1, comprising:

stopping the vehicle with its driver seat directed to the operator.

5. The parking control method according to claim 1, comprising:

when the vehicle approaches the operator with a rear part facing the operator, stopping the vehicle so that the rear part is present within a predetermined distance from the operator, or when the vehicle approaches the operator with a front part facing the operator, stopping the vehicle so that the front part is present within the predetermined distance from the operator.

6. A parking control method comprising:

performing parking control of moving a vehicle to a target parking position on a basis of an operation command acquired from an operator located outside the vehicle;

detecting a position of the operator;

when the parking control to the target parking position is suspended and the vehicle leaves the target parking position, moving the vehicle so that at least part of the vehicle is present within a predetermined range from the operator; and when an obstacle exists around the operator, expanding the predetermined range as compared with when the obstacle does not exist around the operator.

7. A parking control apparatus comprising a control device configured to perform parking control of moving a vehicle along a parking route generated by a parking route generation process to a target parking position on a basis of an operation command acquired from an operator located outside the vehicle, the control device operating to:

detect a position of the operator; and when the parking control to the target parking position is suspended and the vehicle leaves the target parking position, move the vehicle so that at least part of the vehicle is present within a predetermined range from the operator.

* * * * *